(12) United States Patent
Jang et al.

(10) Patent No.: US 10,671,071 B2
(45) Date of Patent: Jun. 2, 2020

(54) CONTROL METHOD AND CONTROL DEVICE OF AUTOMATIC DRIVING VEHICLE

(71) Applicant: Nissan Motor Co., Ltd., Yokohama-shi, Kanagawa (JP)

(72) Inventors: Hwaseon Jang, Kanagawa (JP);
Takashi Sunda, Kanagawa (JP);
Machiko Hiramatsu, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/324,011

(22) PCT Filed: Aug. 9, 2016

(86) PCT No.: PCT/JP2016/073471
§ 371 (c)(1),
(2) Date: Feb. 7, 2019

(87) PCT Pub. No.: WO2018/029789
PCT Pub. Date: Feb. 15, 2018

(65) Prior Publication Data
US 2019/0171211 A1 Jun. 6, 2019

(51) Int. Cl.
*G05D 1/00* (2006.01)
*B60W 40/09* (2012.01)
(Continued)

(52) U.S. Cl.
CPC .......... *G05D 1/0088* (2013.01); *B60K 31/00* (2013.01); *B60W 30/10* (2013.01); *B60W 30/14* (2013.01);
(Continued)

(58) Field of Classification Search
CPC ......... G05D 1/0088; G05D 2201/0213; G05D 1/0061; G06N 20/00; G06N 3/008;
(Continued)

(56) References Cited

U.S. PATENT DOCUMENTS 8,068,968 B2 * 11/2011 Kondoh ................ B60W 40/08
701/96
8,552,850 B2 * 10/2013 De Mers ................ A61B 5/163
340/439

(Continued)

FOREIGN PATENT DOCUMENTS

GB          2532457 A      5/2016
JP        H9-249104 A      9/1997
(Continued)

*Primary Examiner* — Hunter B Lonsberry
*Assistant Examiner* — Luis A Martinez Borrero
(74) *Attorney, Agent, or Firm* — Young Basile Hanlon & MacFarlane, P.C.

(57) ABSTRACT

An interest level detection unit configured to detect a level of interest of an occupant in a travel state of an automatic driving vehicle, a manual driving characteristic learning unit configured to learn manual driving characteristics based on the travel state of the automatic driving vehicle, and an automatic driving characteristic setting unit configured to set automatic driving characteristics based on a surrounding state of the automatic driving vehicle, an interest level determination unit configured to determine the occupant's level of interest in the vehicle travel and a driving characteristic setting unit configured to set the driving characteristics based on the manual driving characteristics learned in the manual driving characteristic learning unit when the level of interest is determined to be high and set the automatic driving characteristics set by the automatic driving characteristic setting unit when the level of interest is determined to be low.

14 Claims, 18 Drawing Sheets

(51) Int. Cl.
  *B60W 30/10* (2006.01)
  *B60W 30/14* (2006.01)
  B60K 31/00 (2006.01)
  *G06N 20/00* (2019.01)
  *B60W 40/08* (2012.01)
  *B60W 50/00* (2006.01)
  *B60W 50/08* (2020.01)

(52) U.S. Cl.
  CPC ............ *B60W 40/08* (2013.01); *B60W 40/09* (2013.01); *B60W 50/0098* (2013.01); *B60W 50/085* (2013.01); *G06N 20/00* (2019.01); *B60W 2040/0872* (2013.01); *B60W 2540/22* (2013.01); *B60W 2554/00* (2020.02); *G05D 2201/0213* (2013.01)

(58) Field of Classification Search
  CPC ......... G06N 5/02; B60K 31/00; B60W 40/10; B60W 50/14; B60W 40/08; B60W 40/09
  See application file for complete search history.

(56) References Cited

U.S. PATENT DOCUMENTS

| | | | |
|---|---|---|---|
| 9,753,459 B2 * | 9/2017 | Mueller | B60W 30/18163 |
| 9,776,644 B2 * | 10/2017 | Chun | B60C 5/005 |
| 9,840,257 B2 | 12/2017 | Ebina | |
| 9,878,723 B2 * | 1/2018 | Kim | B60W 50/14 |
| 9,956,963 B2 * | 5/2018 | Vijaya Kumar | B60W 40/08 |
| 10,108,190 B2 * | 10/2018 | Tomatsu | B60W 40/08 |
| 10,124,729 B2 * | 11/2018 | Lee | B60R 1/00 |
| 10,152,633 B2 * | 12/2018 | Tomimori | G06F 3/013 |
| 10,166,997 B2 * | 1/2019 | Oba | B60W 50/082 |
| 10,223,602 B2 * | 3/2019 | Paszkowicz | B60W 50/0098 |
| 10,317,900 B2 * | 6/2019 | Kamhi | G05D 1/0088 |
| 10,331,127 B2 * | 6/2019 | Oba | B60W 50/14 |
| 10,394,236 B2 * | 8/2019 | Wiklinska | B60W 50/0098 |
| 10,449,856 B2 * | 10/2019 | Kojima | B60W 40/09 |
| 10,493,997 B2 * | 12/2019 | Kim | B60W 50/082 |
| 2003/0006888 A1 * | 1/2003 | Burchette, Jr. | B60R 1/12 340/425.5 |
| 2005/0030184 A1 | 2/2005 | Victor | |
| 2007/0268146 A1 * | 11/2007 | Itou | G08B 21/06 340/576 |
| 2008/0185207 A1 * | 8/2008 | Kondoh | B60W 30/16 180/272 |
| 2009/0268025 A1 * | 10/2009 | Hiramaki | B60R 1/00 348/148 |
| 2011/0199202 A1 * | 8/2011 | De Mers | G02B 27/0093 340/439 |
| 2012/0072097 A1 | 3/2012 | Ohta et al. | |
| 2012/0133528 A1 * | 5/2012 | Lee | B60K 28/066 340/945 |
| 2015/0054951 A1 * | 2/2015 | Maytal | G06K 9/00845 348/148 |
| 2015/0151753 A1 * | 6/2015 | Clarke | B60W 30/0953 701/25 |
| 2015/0189241 A1 * | 7/2015 | Kim | G06F 3/017 348/148 |
| 2015/0197246 A1 | 7/2015 | Nagasaka et al. | |
| 2016/0001781 A1 * | 1/2016 | Fung | G16H 50/20 701/36 |
| 2016/0009295 A1 | 1/2016 | Chun et al. | |
| 2016/0121794 A1 * | 5/2016 | Iguchi | G06T 7/70 345/7 |
| 2016/0144786 A1 * | 5/2016 | Lee | B60R 1/00 348/148 |
| 2016/0170413 A1 * | 6/2016 | Mueller | G05D 1/0088 701/23 |
| 2016/0187879 A1 * | 6/2016 | Mere | B60W 40/09 701/23 |
| 2017/0021837 A1 | 1/2017 | Ebina | |
| 2017/0052540 A1 * | 2/2017 | Lokesh | B60W 30/165 |
| 2017/0053534 A1 * | 2/2017 | Lokesh | G08G 1/22 |
| 2017/0108864 A1 * | 4/2017 | Wiklinska | G06K 9/00832 |
| 2017/0240109 A1 * | 8/2017 | Kimura | B60R 1/00 |
| 2017/0247041 A1 * | 8/2017 | Kim | B60W 50/10 |
| 2017/0248954 A1 * | 8/2017 | Tomatsu | B60W 40/08 |
| 2017/0277182 A1 * | 9/2017 | May | B60W 50/082 |
| 2017/0285641 A1 * | 10/2017 | Goldman-Shenhar | B60K 28/02 |
| 2017/0305440 A1 * | 10/2017 | Oba | B60W 50/082 |
| 2017/0329329 A1 * | 11/2017 | Kamhi | B60W 40/08 |
| 2017/0355377 A1 * | 12/2017 | Vijaya Kumar | B60W 40/08 |
| 2017/0364070 A1 * | 12/2017 | Oba | B60W 50/08 |
| 2017/0364148 A1 * | 12/2017 | Kim | B60K 37/06 |
| 2018/0046842 A1 * | 2/2018 | Tomimori | G06F 3/013 |
| 2018/0285665 A1 * | 10/2018 | Paszkowicz | B60W 50/0098 |
| 2018/0326995 A1 * | 11/2018 | Hiramatsu | B60W 50/14 |
| 2018/0339713 A1 * | 11/2018 | Kose | B60W 50/085 |
| 2019/0106122 A1 * | 4/2019 | Oba | B60W 50/082 |
| 2019/0118834 A1 * | 4/2019 | Wiebel-Herboth | B60W 50/16 |
| 2019/0168771 A1 * | 6/2019 | Migneco | B60W 30/09 |
| 2019/0184998 A1 * | 6/2019 | Zheng | G05D 1/0088 |

FOREIGN PATENT DOCUMENTS

| | | |
|---|---|---|
| JP | 2008120271 A | 5/2008 |
| JP | 2008174092 A | 7/2008 |
| JP | 2008197916 A | 8/2008 |
| JP | 2010111260 A | 5/2010 |
| JP | 201475008 A | 4/2014 |
| JP | 201589801 A | 5/2015 |
| JP | 2015135679 A | 7/2015 |
| JP | 201684092 A | 5/2016 |
| WO | 2010134396 A1 | 11/2010 |
| WO | 2015151243 A1 | 10/2015 |

\* cited by examiner

|  | RELEVANT SWITCHES | IRRELEVANT SWITCHES |
|---|---|---|
| EXAMPLE OF SWITCHES | ·SPEED SETTING SWITCH<br>·INTER-VEHICLE DISTANCE SETTING SWITCH<br>·LANE CHANGING SWITCH | ·WINDOW OPENING-CLOSING SWITCH<br>·AUDIO SWITCH<br>·NAVIGATION SWITCH<br>·SEAT POSITION ADJUSTMENT SWITCH<br>·LIGHTING SWITCH |

FIG. 14

| TRAVEL STATE | DEFINITION |
|---|---|
| b1. EXPRESSWAY | EXPRESSWAY |
| b2. TRUNK ROAD | NORMAL LOAD WITH TWO OR MORE LANES ON EACH SIDE |
| b3. NON-TRUNK ROAD | NORMAL ROAD WITH ONE LANE ON EACH SIDE |
| b4. INTERSECTION | INTERSECTION OF NORMAL ROAD |
| b5. CRUISE TRAVEL | NORMAL ROAD OR EXPRESSWAY, NO PRECEDING VEHICLE |
| b6. FOLLOWING TRAVEL | NORMAL ROAD OR EXPRESSWAY, PRECEDING VEHICLE PRESENT |
| b7. INTERSECTION PASSING | INTERSECTION OF NORMAL ROAD, STOP AND THEN RESTART |
| b8. RIGHT TURN | INTERSECTION OF NORMAL ROAD, RIGHT TURN |

CONTROL METHOD AND CONTROL DEVICE OF AUTOMATIC DRIVING VEHICLE

TECHNICAL FIELD

The present invention relates to a control method and a control device of an automatic driving vehicle.

BACKGROUND

Japanese Patent Application Publication No. 2014-75008 discloses a technique in which biometric information of an occupant of a vehicle is detected and a driving operation is assisted depending on the detected biometric information.

However, the conventional example disclosed in Japanese Patent Application Publication No. 2014-75008 does not consider the occupant's level of interest in a travel state. Accordingly, automatic driving control cannot be performed depending on the occupant's level of interest. Thus, the conventional example has a problem that automatic driving control appropriately reflecting the intention of the occupant cannot be performed.

SUMMARY

The present invention has been made to solve the conventional problems described above and an object thereof is to provide a control method and a control device of the automatic driving vehicle which enable automatic driving control appropriately reflecting an intention of an occupant.

In one aspect of the present invention, a level of interest of an occupant in a travel state of an automatic driving vehicle is detected and the vehicle is controlled based on driving characteristics depending on the level of interest.

According to the one aspect of the present invention, automatic driving appropriately reflecting an intention of an occupant can be performed.

BRIEF DESCRIPTION OF THE DRAWINGS

FIG. 14 is an explanatory view illustrating classification of travel states;

DETAILED DESCRIPTION

Figure 1:
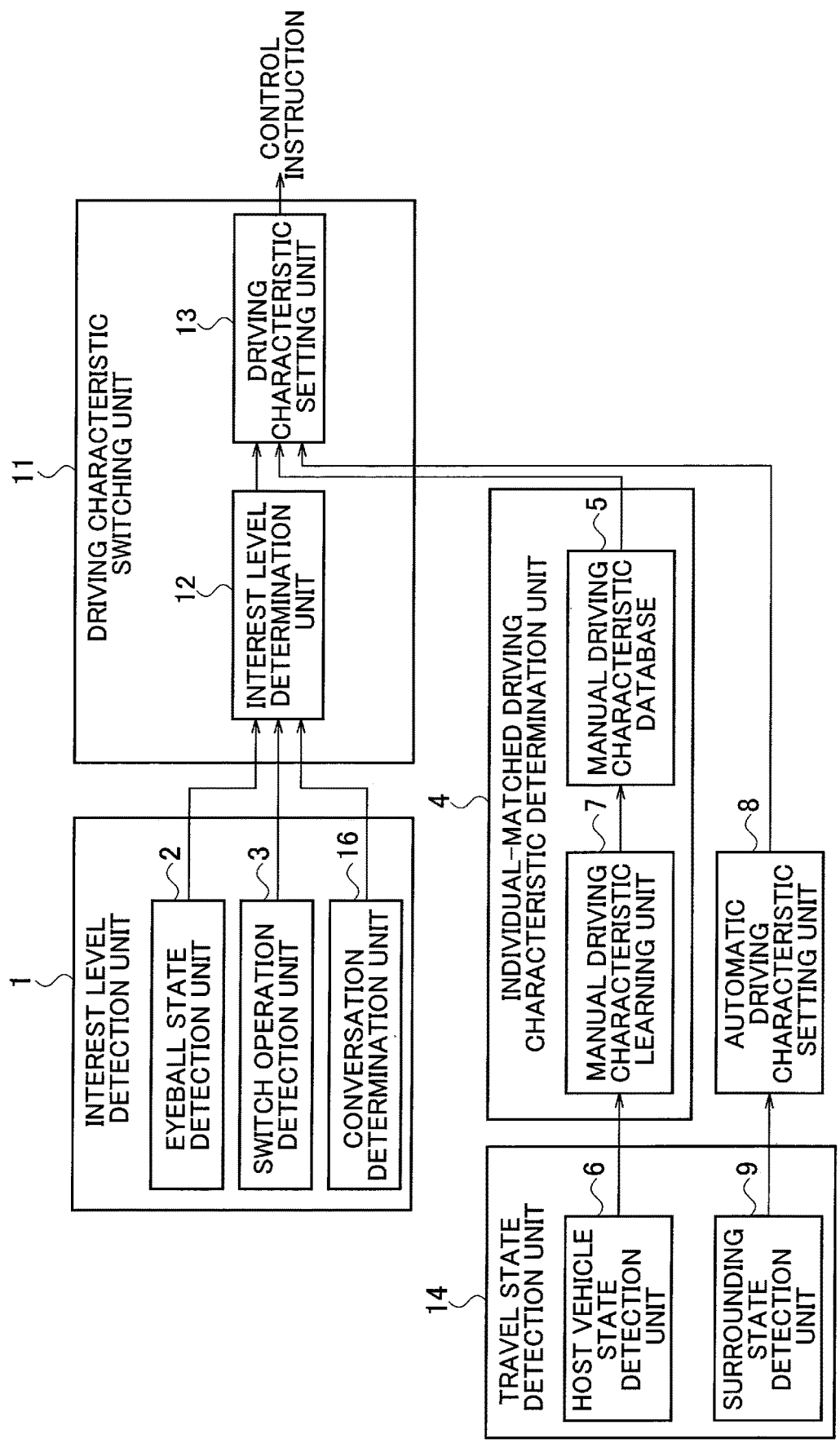
FIG. 1 is a block diagram illustrating a configuration of a control device of an automatic driving vehicle according to an embodiment of the present invention.

An embodiment of the present invention is described below with reference to the drawings. FIG. 1 is a block diagram illustrating a configuration of a control device of an automatic driving vehicle according to one embodiment of the present invention. As illustrated in FIG. 1, the control device of the automatic driving vehicle includes an interest level detection unit 1, a travel state detection unit 14, an individual-matched driving characteristic determination unit 4, an automatic driving characteristic setting unit 8, and a driving characteristic switching unit 11.

Functions described in the embodiment can be implemented by one or multiple processing circuits. The processing circuit includes a processing device with an electric circuit. The processing device includes devices such as an application-specific integrated circuit (ASIC) and conventional circuit parts designed to execute the functions described in the embodiment.

[Description of Interest Level Detection Unit 1]

The interest level detection unit 1 detects a level of interest of an occupant (for example, driver) of a host vehicle in a current travel state of the host vehicle and determines whether the level of interest is higher than a reference value. The interest level detection unit 1 includes an eyeball state detection unit 2 which detects movement of the eyeballs of the occupant, a switch operation detection unit 3 which detects frequency of operating various switches mounted in the vehicle, and a conversation determination unit 16 which analyzes conversation of the occupant. Detection results of the eyeball state detection unit 2, the switch operation detection unit 3, and the conversation determination unit 16 are outputted to an interest level determination unit 12 of the driving characteristic switching unit 11.

<Eyeball State Detection Unit 2>

Figure 2:
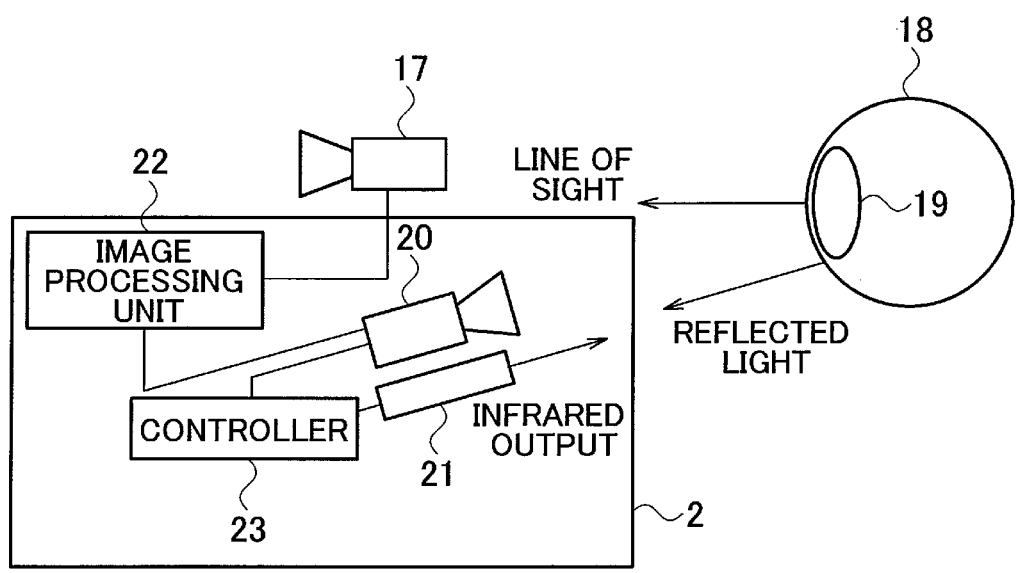
FIG. 2 is a block diagram illustrating a configuration of an eyeball state detection unit according to the embodiment of the present invention.

FIG. 2 is a block diagram illustrating a configuration of the eyeball state detection unit 2. As illustrated in FIG. 2, the eyeball state detection unit 2 includes an infrared light 21 which emits infrared rays toward the eyeball 18 of the occupant, an infrared camera 20 which captures an image of the infrared rays reflected on the pupil 19 of the eyeball 18, and a light-camera controller 23 which controls the infrared light 21 and the infrared camera 20.

Furthermore, the eyeball state detection unit 2 includes an image processing unit 22 which obtains an outside image captured by an outside camera 17 configured to capture an image of the outside of the vehicle (for example, a forward view ahead of the vehicle) and performs processing such as line-of-sight analysis and blinking analysis of the occupant based on the outside image and the image captured by the infrared camera 20. Moreover, the eyeball state detection unit 2 detects the direction of the line of sight of the occupant based on the movement of the eyeball 18 of the occupant.

Figure 3:
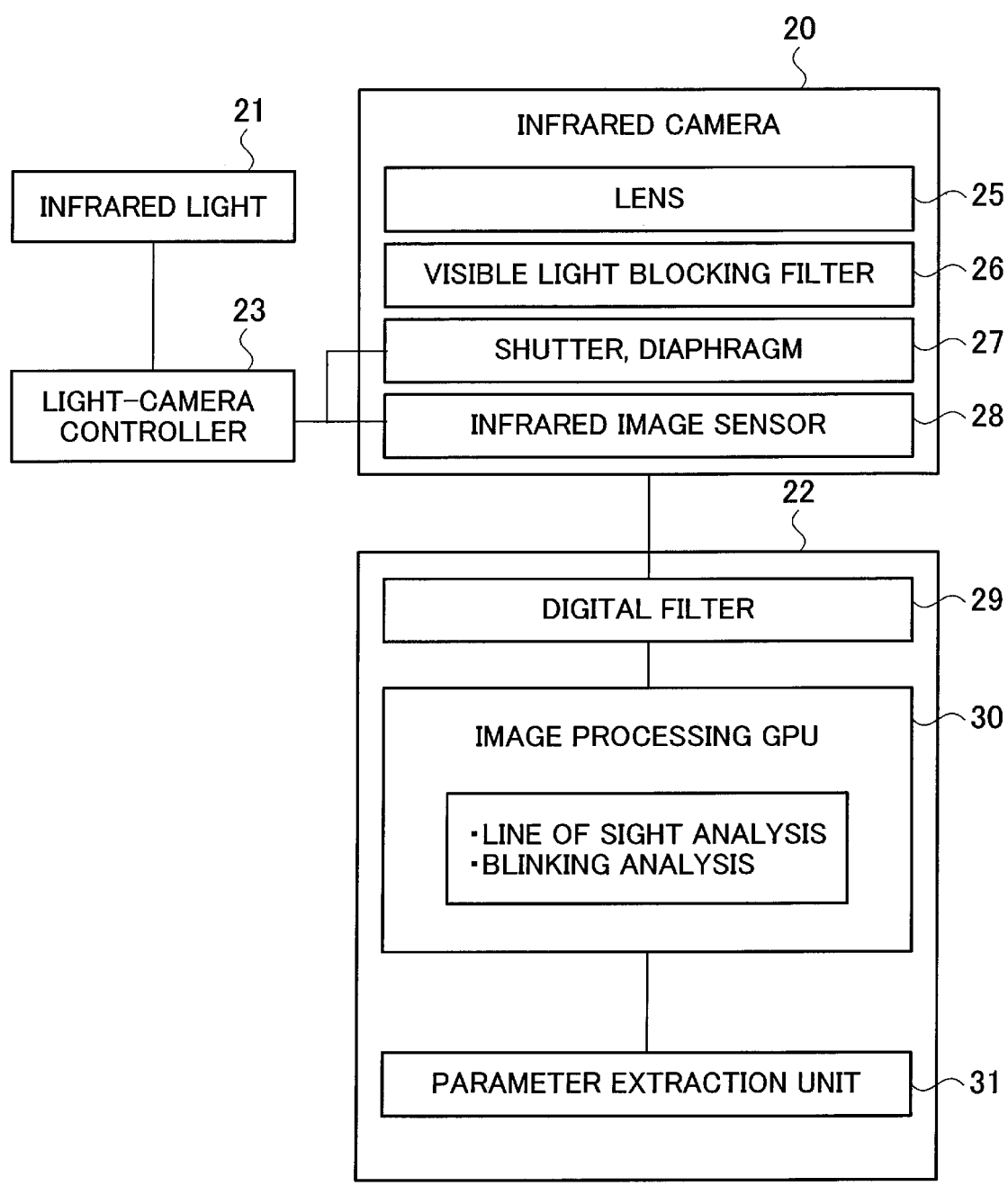
FIG. 3 is a block diagram illustrating a configuration of an image processing unit according to the embodiment of the present invention.

FIG. 3 is a block diagram illustrating the configuration of the eyeball state detection unit 2 in detail. As illustrated in FIG. 3, the infrared camera 20 includes a lens 25, a visible light blocking filter 26, a shutter-diaphragm 27, and an infrared image sensor 28. The light-camera controller 23 controls the shutter-diaphragm 27 and the infrared image sensor 28 to capture an image of reflected light of the infrared rays emitted to the eyeball 18.

The image processing unit 22 includes a digital filter 29, an image processing GPU (Graphics Processing Unit) 30, and a parameter extraction unit 31.

The digital filter 29 performs filtering processing on the image captured by the infrared camera 20 and the image captured by the outside camera 17.

The image processing GPU 30 performs various types of image processing such as analyzing the direction of the line of sight of the occupant and analyzing the blinking of the occupant based on the image captured by the infrared camera 20 and the image captured by the outside camera 17.

The parameter extraction unit 31 extracts a "surrounding gazing parameter" indicating whether the occupant is gazing at the vehicle surroundings based on the outside image captured by the outside camera 17 and the direction of the line of sight of the occupant obtained in the image processing performed by the image processing GPU 30. Moreover, the parameter extraction unit 31 extracts a "blinking parameter" indicating whether the occupant is blinking. Then, the parameter extraction unit 31 outputs the extracted surrounding gazing parameter and blinking parameters to the interest level determination unit 12 illustrated in FIG. 1.

Figure 4:
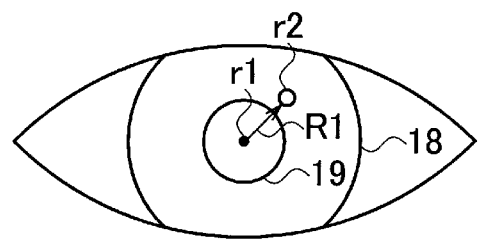
FIG. 4 is an explanatory view illustrating the eyeball of an occupant, the center of the pupil included in the eyeball, and the center of reflected light.

Next, processing of detecting the direction of the line of sight of the occupant which is performed by the eyeball state detection unit 2 is described with reference to FIGS. 4 to 7. FIG. 4 is an explanatory view illustrating the eyeball 18 of the occupant, the center r1 of the pupil 19 included in the eyeball 18, and the center r2 of the reflected light.

When the line of sight of the occupant is to be detected, the infrared light 21 illustrated in FIG. 2 emits an infrared beam to the eyeball 18 of the occupant. As illustrated in FIG. 4, the eyeball state detection unit 2 detects the reflected light of the infrared beam and the center of the pupil 19 with the infrared camera 20. Then, the eyeball state detection unit 2 calculates the output vector R1 from the center r1 of the pupil 19 to the center r2 of the reflected light.

Moreover, the eyeball state detection unit 2 calculates the positional relationship between the infrared camera 20 and the reflected light of the infrared beam based on the position of the reflected light. Then, the eyeball state detection unit 2 obtains the positional relationship between the infrared camera 20 and the center of the pupil 19 based on the aforementioned output vector R1 and the positional relationship between the infrared camera 20 and the reflected light. As a result, the eyeball state detection unit 2 can recognize the direction of the line of sight of the occupant, that is a position where the occupant is viewing in the vehicle surroundings.

Figure 5A:
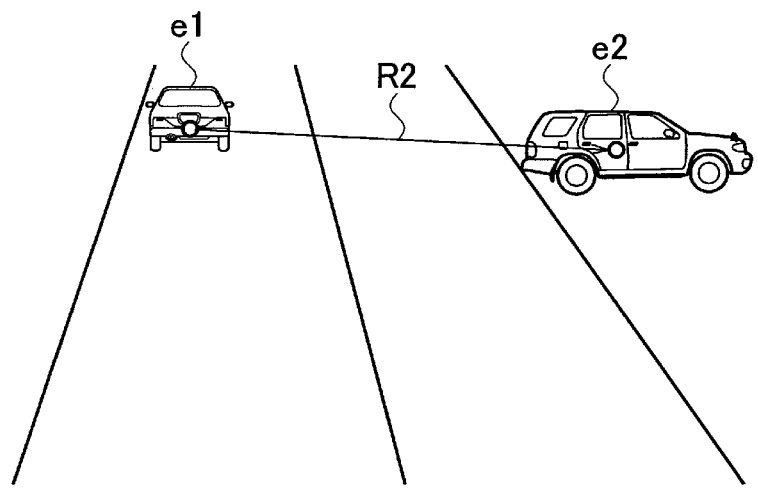
FIG. 5A is an explanatory view illustrating a state of an area in front of the host vehicle and a direction of movement of the occupant's line of sight.
Figure 5B:
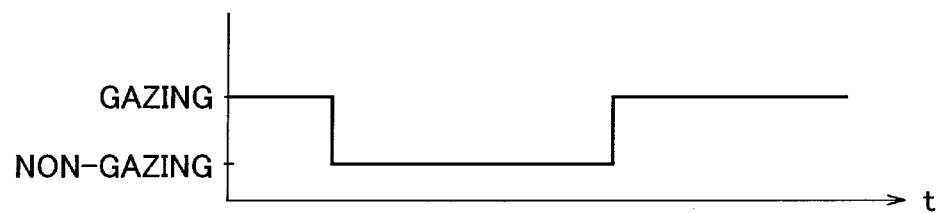
FIG. 5B is an explanatory view illustrating a state where the occupant is gazing at an object and a state where the occupant is not.
Figure 6:
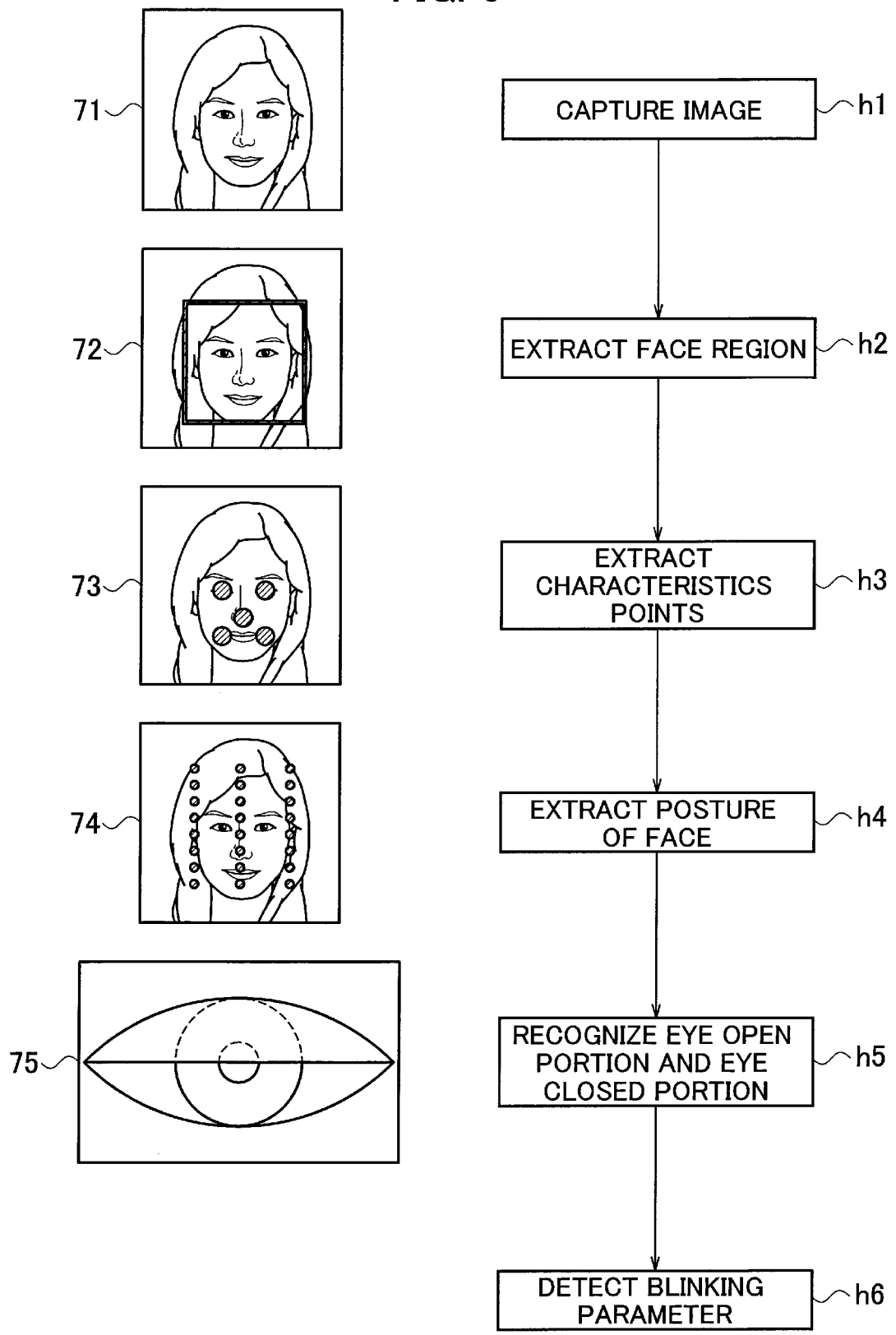
FIG. 6 is an explanatory view illustrating steps of capturing an image of the face of the occupant and extracting blinking parameters.

Next, the aforementioned surrounding gazing parameter is described. FIG. 5A is an explanatory view illustrating a forward view image of the host vehicle and FIG. 5B is an explanatory view illustrating a state where the occupant is gazing at an object and a state where the occupant is not. A situation in which the position where a front object (another vehicle or the like) in the image captured by the outside camera 17 is present matches the line of the sight of the occupant is referred to as "seeing." For example, when the line of the sight of the occupant is directed toward a preceding vehicle e1 illustrated in FIG. 5A, the eyeball state detection unit 2 determines that the occupant sees the preceding vehicle e1. When the line of sight of the occupant is directed toward a vehicle e2 present on a roadside, the eyeball state detection unit 2 determines that the occupant sees the vehicle e2.

Moreover, a situation in which the state where the movement angular velocity of the eyeball is 10 [deg/s] or less (state where the line of sight is stationary) continues for a threshold time τh (for example, 165 msec) or more after the recognition of the seeing is referred to as "gazing." As a result, as illustrated in FIG. 5B, gazing time and non-gazing time are obtained. A surrounding gazing level F1 [%] which is a proportion of the gazing time to a fixed time is defined by the following formula (1):

$$F1 = Ta/(Ta+Tb)*100 \qquad (1).$$

In the formula (1), Ta is the gazing time for a target in the fixed time and Tb is the non-gazing time in the fixed time.

When the surrounding gazing level of the occupant is high, it is possible to assume that the occupant's level of interest in the travel state is high. The eyeball state detection unit 2 outputs the surrounding gazing level F1 calculated by using the aforementioned formula (1) to the interest level determination unit 12 illustrated in FIG. 1 as the surrounding gazing parameter.

Next, the blinking parameters are described. Steps of detecting the blinking parameters indicating whether the occupant is blinking or not are described with reference to FIG. 6. In step h1 of FIG. 6, the eyeball state detection unit 2 captures a face image 71 of the occupant with the infrared camera 20. In step h2, the eyeball state detection unit 2 extracts a face region 72 from the face image 71 captured in the processing of step h1.

In step h3, the eyeball state detection unit 2 obtains an image 73 in which characteristics points are extracted from the face region 72. In step h4, the eyeball state detection unit 2 obtains an image 74 indicating the posture of the face determined from the characteristic points of the face. In step h5, the eyeball state detection unit 2 determines an eye open portion and an eye closed portion from an image of the eye of the occupant. An eye opening degree indicating an eye opening proportion relative to the fully-opened state can be obtained based on the eye open portion and the eye closed portion. In step h6, the eyeball state detection unit 2 detects the blinking parameter. Note that, since the image processing described in steps h1 to h5 is a well-known technique, detailed description thereof is omitted.

Figure 7:
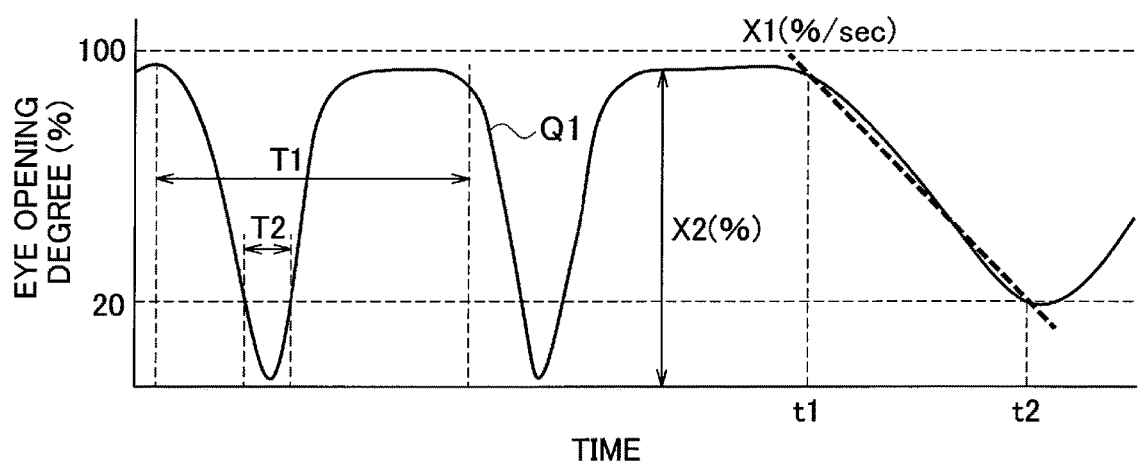
FIG. 7 is a graph depicting changes in an eye opening degree of the occupant over time.

A method of detecting the blinking parameters in step h6 is described below. FIG. 7 is a graph depicting changes in the eye opening degree of the occupant over time. As illustrated by the curve Q1, the eye opening degree of the occupant periodically changes. An interval between time points of the maximum eye opening degree is referred to as blinking interval T1. Eye closed time T2 is calculated with the situation where the eye opening degree is 20% or less defined as the eye closed state. A numerical value calibrated in advance for each occupant is used as the maximum eye opening degree.

The eyeball state detection unit 2 calculates an opening-closing behavior characteristic amount PE indicating a proportion of the eye closed time to the blinking interval of the eyeball 18 by using the following formula (2).

$$PE=(T2/T1)*100[\%] \qquad (2)$$

Moreover, the eyeball state detection unit 2 measures elapsed time from the time point of the maximum eye opening degree (for example, t1) to the time point of eye closing (for example, t2) and calculates an eye closing speed X1 [%/sec]. Furthermore, the eyeball state detection unit 2 calculates the eye opening degree X2 [%] in the eye open state.

When the aforementioned opening-closing behavior characteristic amount PE is high, the degree of eye closing of the occupant is high and it can be said that the level of interest in the travel state is low. In other words, when the opening-closing behavior characteristic amount PE is lower than a preset threshold (second threshold PEth), it is possible to assume that the occupant's level of interest in the travel state is high. Moreover, when the eye closing speed X1 is high or the eye opening degree X2 in the eye open state is high, the degree of gazing at the surroundings of the host vehicle is high and it is possible to assume that the occupant's level of interest in the travel state is high.

Then, the eyeball state detection unit 2 outputs the eye closing speed X1, the eye opening degree X2 in the eye open state, and the opening-closing behavior characteristic amount PE calculated by using the formula (2) to the interest level determination unit 12 illustrated in FIG. 1 as the blinking parameters.

<Switch Operation Detection Unit 3>

Next, the switch operation detection unit 3 is described. The switch operation detection unit 3 detects operations of various switches mounted in the vehicle and outputs detection data to the interest level determination unit 12 illustrated in FIG. 1. The various switches mounted in the vehicle are classified into switches relevant to travel of the vehicle (hereafter referred to as "relevant switches") and switches irrelevant to travel of the vehicle (hereafter referred to as "irrelevant switches").

Figures 8, 9:
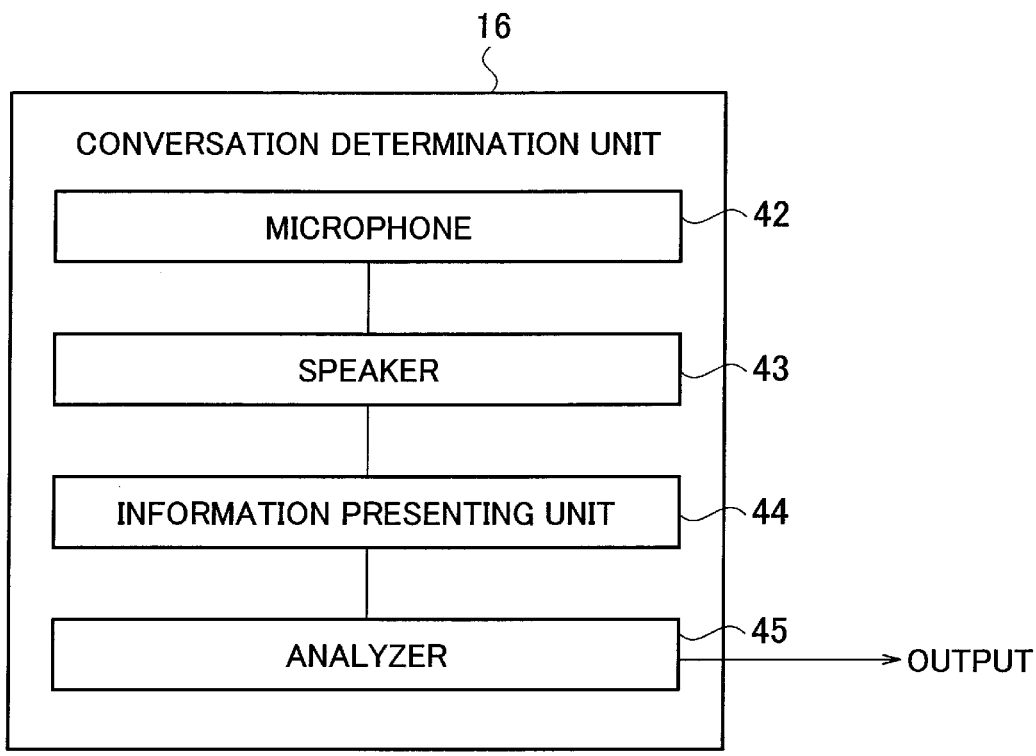
FIG. 8 is an explanatory view depicting relevant switches and irrelevant switches mounted in the vehicle.
FIG. 9 is a block diagram illustrating a detailed configuration of a conversation determination unit.

As illustrated in FIG. 8, the relevant switches include, for example, a speed setting switch, an inter-vehicle distance setting switch, a lane changing switch, and the like. Meanwhile, the irrelevant switches include, for example, a window opening-closing switch, an audio operation switch, a navigation operation switch, a seat position adjustment switch, a lighting switch, and the like.

As described later, when the operation frequency of the relevant switches (number of times the switches are operated in a fixed time) is high, the interest level determination unit 12 illustrated in FIG. 1 determines that the occupant's level of interest in the travel state is high. In contrast, when the operation frequency of the relevant switches (number of times the switches are operated in a fixed time) is low, the interest level determination unit 12 determines that the occupant's level of interest in the travel state is low. Moreover, when the operation frequency of the irrelevant switches is high, the interest level determination unit 12 determines that the occupant's level of interest in the travel state is low. When the operation frequency of the irrelevant switches is low, the interest level determination unit 12 determines that the occupant's level of interest in the travel state is high.

<Conversation Determination Unit 16>

Next, the conversation determination unit 16 is described. As illustrated in FIG. 9, the conversation determination unit 16 includes a microphone 42 which detects voice, a speaker 43, an information presenting unit 44 which presents various types of information to the occupant, and an analyzer 45 which analyzes the conversation of the occupant. The conversation determination unit 16 recognizes the voice of the occupant by using voice data of the occupant registered in advance to distinguish the voice of the occupant from other voices and sounds. The conversation includes conversation between the occupant and the other occupants and the conversation between the occupant and the vehicle. The level of interest may be detected by analyzing the voice, specifically, the speed of the conversation of the occupant, the loudness of voice, and the like in the conversation of the occupant. For example, when the speed of the conversation of the occupant is high, the level of interest may be determined to be low under the assumption that the occupant is concentrating on the conversation rather than driving. Moreover, for example, when the voice of the occupant is small, the level of interest may be determined to be high under the assumption that the possibility of the occupant talking to himself or herself is high and the occupant is not concentrating on the conversation. As the conversation between the occupant and the vehicle, the information presenting unit 44 may provide various conversation (daily conversation, quiz, or the like) from the speaker 43 to the occupant. For example, the information presenting unit 44 may give questions such as "how many km is the speed limit of the road" or "what color is the preceding vehicle." Then, the microphone 42 detects the speech (voice) of the occupant and the analyzer 45 recognizes and analyzes the speech (voice) of the occupant for this conversation.

Then, as described later, the interest level determination unit 12 estimates a consciousness amount of the occupant analyzed in the conversation determination unit 16 and determines that the level of interest is high when the consciousness amount is great.

[Description of Travel State Detection Unit 14]

Next, the travel state detection unit 14 illustrated in FIG. 1 is described. The travel state detection unit 14 includes a host vehicle state detection unit 6 which detects the travel state of the host vehicle and a surrounding state detection unit 9 which detects the state of the surroundings of the host vehicle.

Figure 10:
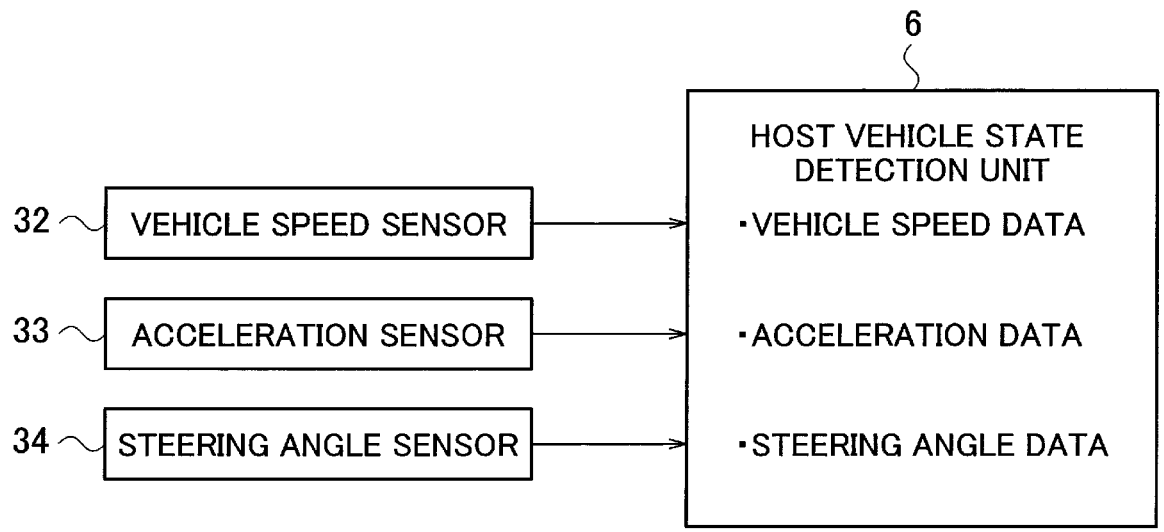
FIG. 10 is a block diagram illustrating a detailed configuration of a host vehicle state detection unit.

As illustrated in FIG. 10, the host vehicle state detection unit 6 obtains vehicle speed data detected by a vehicle speed sensor 32, acceleration data detected by an acceleration sensor 33, and steering angle data detected by a steering angle sensor 34, and detects the travel state of the host vehicle based on these pieces of data. The pieces of data detected in the host vehicle state detection unit 6 are outputted to a manual driving characteristic learning unit 7 illustrated in FIG. 1.

Figure 11:
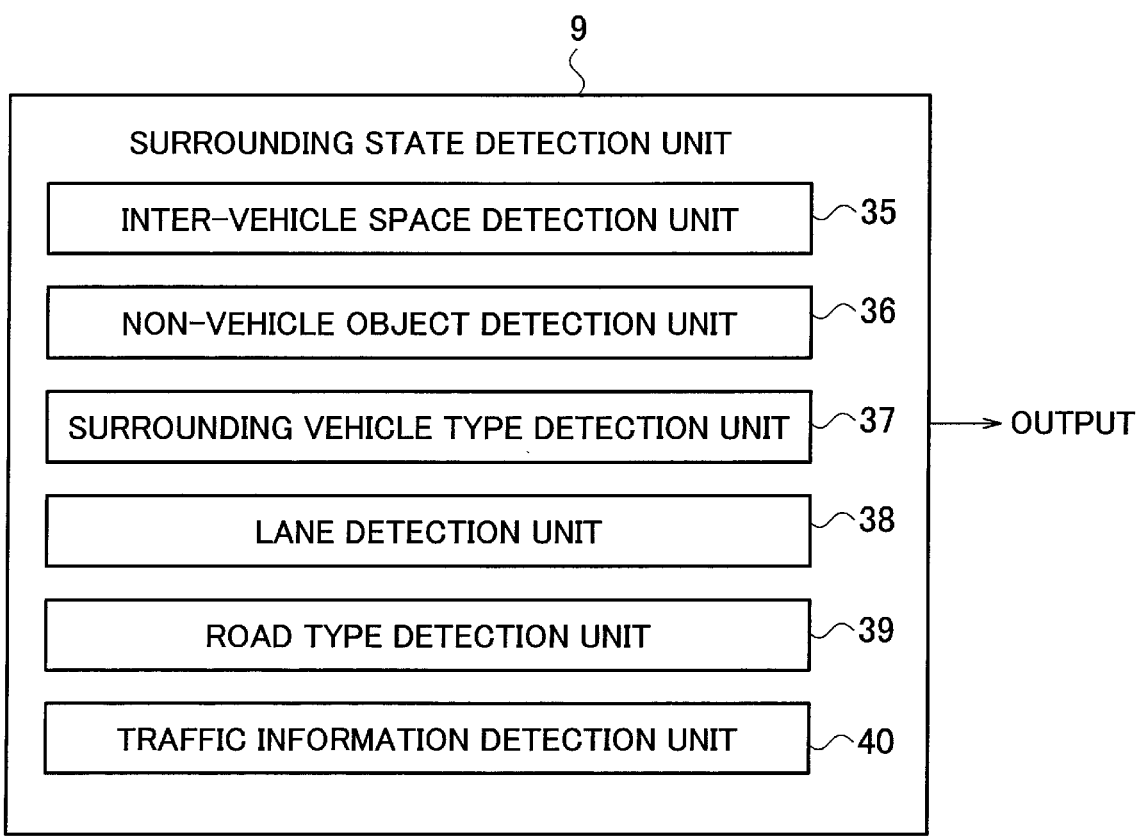
FIG. 11 is a block diagram illustrating a detailed configuration of a surrounding state detection unit.

As illustrated in FIG. 11, the surrounding state detection unit 9 includes an inter-vehicle space detection unit 35, a non-vehicle object detection unit 36, a surrounding vehicle type detection unit 37, a lane detection unit 38, a road type detection unit 39, and a traffic information detection unit 40.

The inter-vehicle space detection unit 35 detects front, rear, left, and right inter-vehicle spaces of the host vehicle by using a radar or the like. The non-vehicle object detection unit 36 detects objects other than vehicles such as pedestrians and bicycles in the surroundings of the host vehicle, based on images captured by cameras configured to capture images of the surroundings.

The surrounding vehicle type detection unit 37 detects the vehicles in the surroundings of the host vehicle from the images captured by the cameras and detects the types of the detected vehicles. For example, the surrounding vehicle type detection unit 37 detects passenger cars, trucks, buses, motorcycles, and the like. The lane detection unit 38 detects lanes in the road from the images captured by the cameras.

The road type detection unit 39 detects the type of the road from information obtained from the navigation device. The traffic information detection unit 40 detects traffic information from information obtained by the navigation device. Note that the aforementioned pieces of information may be detected by means of communication between the vehicles or communication between the vehicle and the road or may be detected by using other sensors such as sonars. The data detected by the surrounding state detection unit 9 is outputted to the automatic driving characteristic setting unit 8 illustrated in FIG. 1.

[Description of Individual-Matched Driving Characteristic Determination Unit 4]

Next, the individual-matched driving characteristic determination unit 4 illustrated in FIG. 1 is described. The individual-matched driving characteristic determination unit 4 includes the manual driving characteristic learning unit 7 which learns driving characteristics of the occupant in manual driving of the host vehicle and a manual driving characteristic database 5 which stores the manual driving characteristics.

The manual driving characteristic learning unit 7 obtains various driving characteristics when the occupant manually drives the vehicle, and stores the driving characteristics in the manual driving characteristic database 5. These driving characteristics are driving characteristics matching the occupant's preference and, as described later, are employed when the occupant's level of interest in the travel state of the host vehicle is higher than the reference value. The details are described below.

The manual driving characteristic learning unit 7 detects the driving characteristics of the occupant from various pieces of data indicating the travel state detected by the host vehicle state detection unit 6 (pieces of data obtained by the sensors illustrated in FIG. 10). The driving characteristics include timing of lane changing, a merging point and merging speed upon entering an expressway, an inter-vehicle distance, average cruising speed, rates of acceleration and deceleration, braking timing, a steering angle speed, a traveling position in a lane (left offset, right offset), timing of right turn passing at an intersection, and the like in the case where the occupant is manually driving the vehicle. Then, the manual driving characteristic learning unit 7 learns a driving action at each of detected characteristic points.

Figure 12:
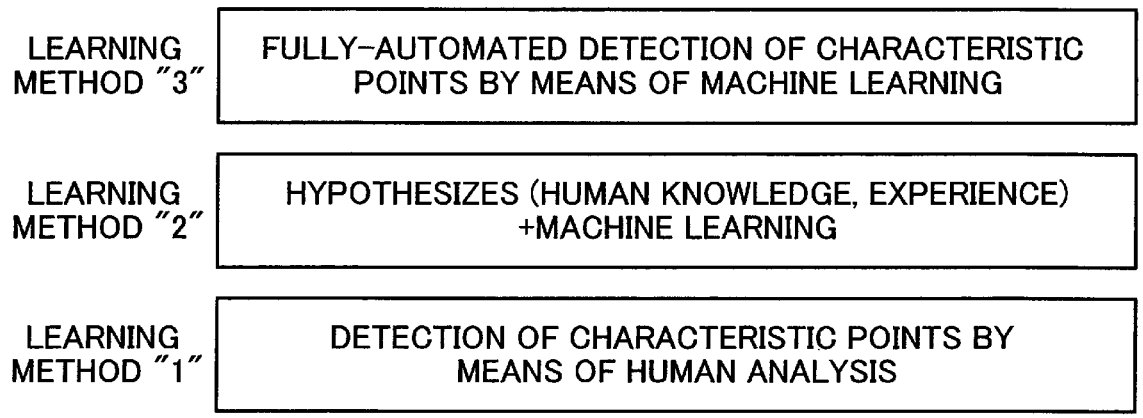
FIG. 12 is an explanatory view illustrating three methods of detecting characteristic points.

Three learning methods are generally known as methods for detecting the driving characteristics. FIG. 12 is an explanatory view illustrating the three learning methods. In a learning method "1," learning is performed by means of human analysis. In a learning method "2," hypothesizes are set based on human knowledge and experience and then learning is performed by means of machine learning. In a learning method "3," learning is fully and automatically performed by means of machine learning. In the embodiment, learning is performed with the learning method "2" employed as an example.

Figure 13:
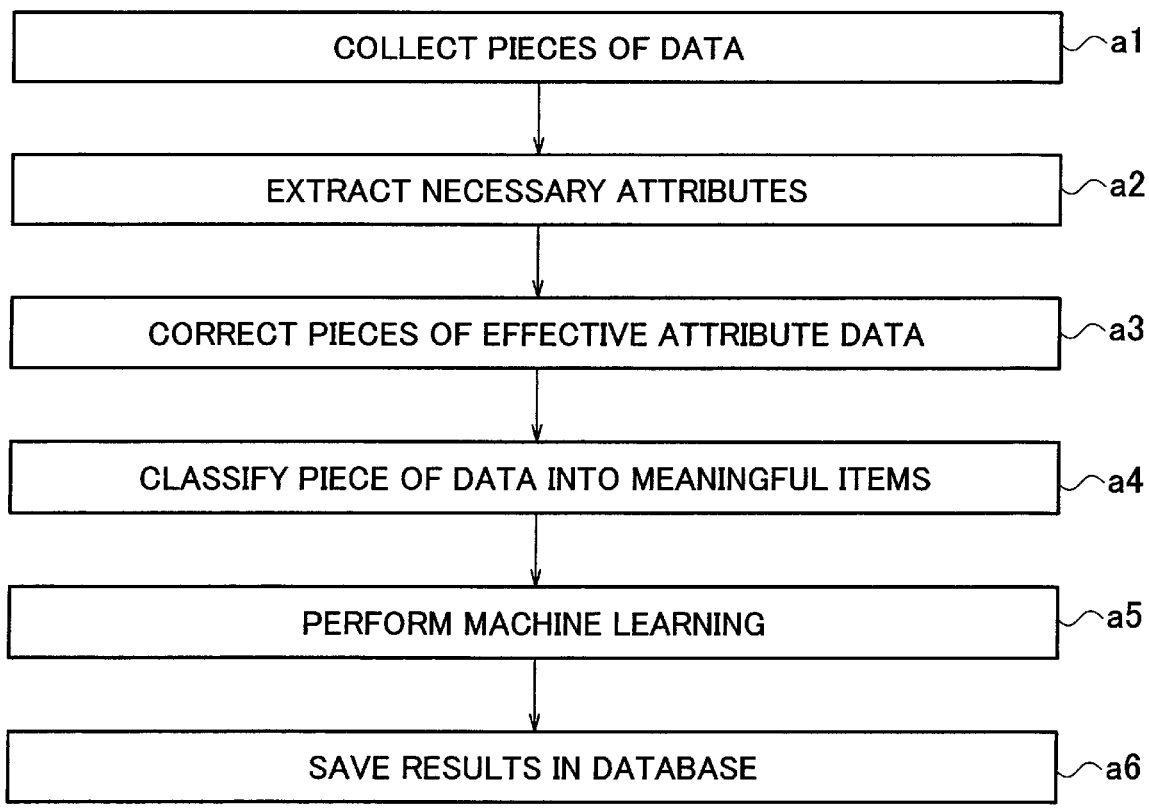
FIG. 13 is an explanatory view illustrating a flow of learning a driving action for the detected characteristics points.

FIG. 13 is an explanatory view illustrating a flow of learning the characteristics from data detected by the travel state detection unit 14. First, in step a1, the manual driving characteristic learning unit 7 collects pieces of data from the travel state detection unit 14. The manual driving characteristic learning unit 7 collects the travel state and the surrounding state of the host vehicle as the pieces of data. After collecting the pieces of data, in step a2, the manual driving characteristic learning unit 7 extracts necessary pieces of attribute data. Not all pieces of data collected by the travel state detection unit 14 are necessarily related to the driving action and, when pieces of data not related to the driving action are used as learning materials, such pieces of data may have adverse effects on the learning result. Accordingly, only the necessary pieces of data (attribute data) are extracted in the processing of step a2.

In step a3, the manual driving characteristic learning unit 7 corrects the pieces of attribute data extracted in the aforementioned processing of step a2 by removing elements such as noise which are included in the pieces of attribute data and which have adverse effects on learning.

Figure 15:
FIG. 15 is an explanatory view illustrating an example of classifying pieces of data on other vehicles into meaningful items.

In step a4, the manual driving characteristic learning unit 7 classifies the pieces of attribute data into meaningful items (parameters). FIG. 15 depicts an example in which pieces of data on the other vehicles are classified into the meaningful items.

Specifically, when objects "1" to "n" which are other vehicles are detected and the "type," "movement," "brake lamp," and "distance from the host vehicle" of each of the other vehicles are detected, the manual driving characteristic learning unit 7 re-classifies these pieces of data and obtains various items such as "the number of preceding vehicles," "the number of preceding trucks," and "distance to each preceding vehicle."

The aforementioned processing in steps a1 to a4 of FIG. 13 are defined as preprocessing and, in step a5, the manual driving characteristic learning unit 7 performs machine learning while using the parameters generated in the preprocessing as inputs of the machine learning. For example, SOM (Self Organizing Map), SVC (Support Vector Machine Classification), SGD (Stochastic Gradient Decent), logistic regression, and the like can be used as an algorithm of the machine learning. The type of road on which the host vehicle is traveling is outputted by this machine learning. Roads are classified into various road types (for example b1 to b8) as illustrated in FIG. 14. Specifically, when the host vehicle is traveling on an expressway, "b1. expressway" is set, when traveling on a normal road with two lanes on each side, "b2. trunk road" is set, when traveling on a normal road with one lane on each side, "b3. non-trunk road" is set, and when traveling in an intersection of a normal road, "b4. intersection" is set. Moreover, when the host vehicle is traveling on a normal road or an expressway and there is no preceding vehicle, "b5. cruise travel" is set, when the host vehicle is traveling on a normal road or an expressway and there is a preceding vehicle, "b6. following travel" is set, when the host vehicle stops at an intersection of a normal road and then restarts, "b7. intersection passing" is set, and when the host vehicle turns right at an intersection of a normal road, "b8. right turn" is set. Note that the classification method is not limited to the aforementioned contents and the number of classification items can be increased or reduced. When there are many classification items, items such as a merging point of an expressway, a branching point of an expressway, a right turn lane of a trunk road, and the like may be added in addition to the aforementioned items. When the number of classification items is reduced, for example, the items can be narrowed to two items of expressway and normal road.

In step a6, the manual driving characteristic learning unit 7 saves the road type determined by the learning and the driving characteristics in this road type in the manual driving characteristic database 5. As described above, in the learning method "2," the classification items in steps a1 to a4 of FIG. 13 are manually set and state parameters are automatically generated in step a5 by means of machine learning in step a6.

Figure 16:
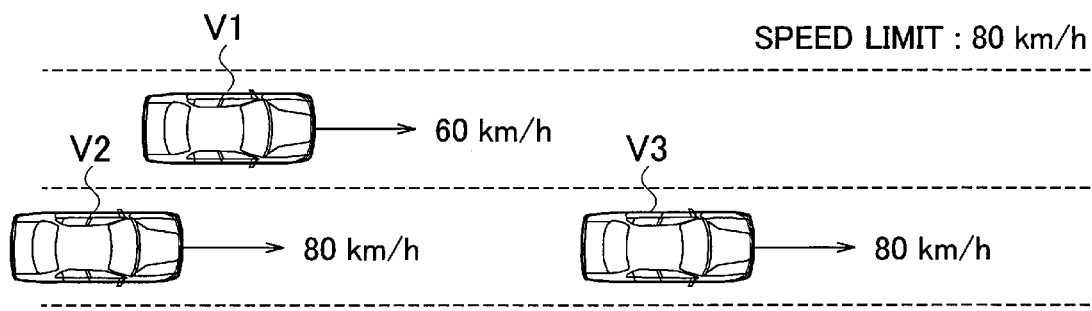
FIG. 16 is an explanatory view illustrating examples of manual driving characteristics learned by a manual driving characteristic learning unit.

FIG. 16 is an explanatory view illustrating an example of the manual driving characteristics learned by the manual driving characteristic learning unit 7 and illustrates a state where the host vehicle V1 is traveling at 60 km/h on a left lane of a road with two lanes on each side and two other vehicles V2, V3 are traveling at 80 km/h on a right lane of the road.

The manual driving characteristic learning unit 7 obtains the type of the travel state, the positional relationships with the other cars in front and behind the host vehicle, the road information (speed limit), and the current travel information of the vehicle (for example, traveling speed) for this travel state by using the aforementioned method.

Then, the manual driving characteristic learning unit 7 calculates meaningful parameters by using the algorithm of the machine learning. As a result, the manual driving characteristic learning unit 7 obtains, for example, such a learning result that, in the cruise travel, the host vehicle travels at speed 75% of the speed limit (travels at 60 km/h on a road with a speed limit of 80 km/h). This learning result is saved in the manual driving characteristic database 5. Note that the cruise travel in the embodiment is defined as travel in which a situation where the inter-vehicle time (numerical value obtained by dividing the inter-vehicle distance by the traveling speed) between the host vehicle and the preceding vehicle is two seconds or more continues for 30 seconds or more.

[Description of Automatic Driving Characteristic Setting Unit 8]

Next, the automatic driving characteristic setting unit 8 illustrated in FIG. 1 is described. As described later, the automatic driving characteristic setting unit 8 sets the driving characteristics selected when the occupant's level of interest in the travel state is low. Details are described below with reference to FIGS. 17 to 20.

Figure 17A:
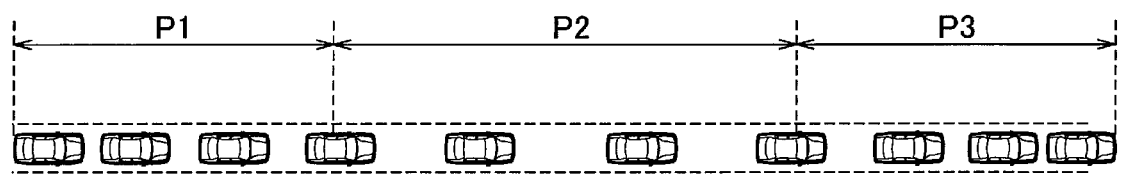
FIG. 17A is an explanatory view illustrating a travel state in which the host vehicle is performing cruise travel without employing automatic driving characteristics.
Figure 17B:
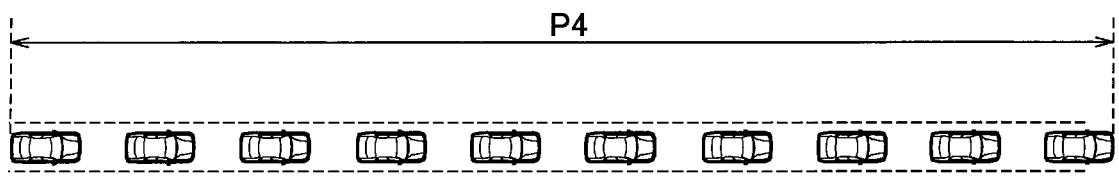
FIG. 17B is an explanatory view illustrating a travel state in which the host vehicle is performing cruise travel while employing the automatic driving characteristics.

FIGS. 17A to 17B are explanatory views illustrating an example of determining automatic driving characteristics when the host vehicle is performing cruise travel in automatic driving. The automatic driving characteristic setting unit 8 obtains the type of travel state (in this case, cruise travel), the positional relationships with other vehicles traveling in front of and behind the host vehicle, and the road information such as the speed limit as input parameters. Then, the automatic driving characteristic setting unit 8 controls the traveling speed of the host vehicle within a range not exceeding the speed limit such that the traveling speed matches the speed of the other vehicles traveling in the surrounding. Matching the traveling speed of the host vehicle with the traveling speed of the other vehicles can eliminate traffic congestion. Specifically, as illustrated in FIG. 17A, when there are congested sections P1, P3 and there is a smooth flow section P2 between the sections P1, P3, matching the traveling speed of the host vehicle with the traveling speed of the other vehicles can eliminate traffic congestion and cause the entire road to be a smooth flow section P4 as illustrated in FIG. 17B.

Figure 18A:
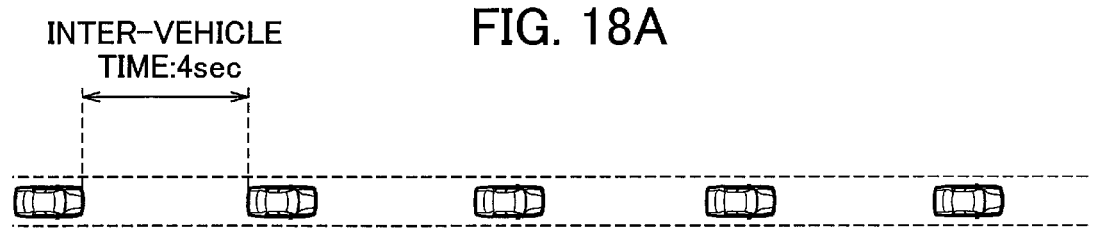
FIG. 18A is an explanatory view illustrating a travel state in which the host vehicle is performing following travel without employing the automatic driving characteristics.
Figure 18B:
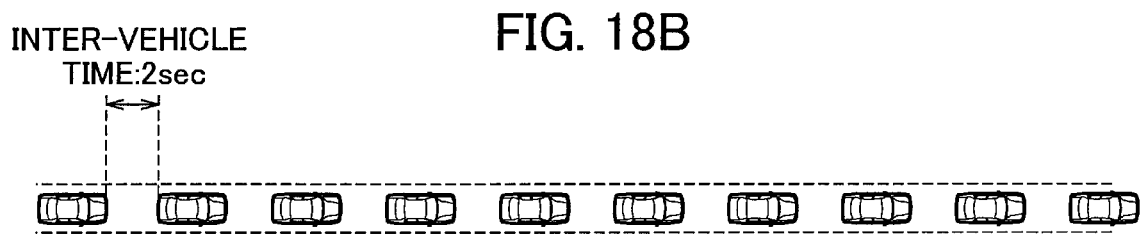
FIG. 18B is an explanatory view illustrating a travel state in which the host vehicle is performing following travel while employing the automatic driving characteristics.

FIGS. 18A and 18B are explanatory views illustrating examples of determining the automatic driving characteristics when the host vehicle is performing following travel which is travel in which the host vehicle follows the preceding vehicle traveling in front. The following travel described in the embodiment is defined as travel in which a situation where the inter-vehicle time between the host vehicle and the preceding vehicle is two seconds or less continues for 30 seconds or more. The automatic driving characteristic setting unit 8 obtains the type of travel state (in this case, following travel) and the positional relationships with other vehicles traveling in front of and behind the host vehicle. The automatic driving characteristic setting unit 8 reduces the inter-vehicle time within a range in which collision with the preceding vehicle is avoidable. Specifically, The automatic driving characteristic setting unit 8 changes the inter-vehicle time of 4 [sec] as illustrated in FIG. 18A to the inter-vehicle time of 2 [sec] as illustrated in FIG. 18B. As a result, the inter-vehicle time is reduced and the number of vehicles traveling in a section with a certain length increases. Hence, the traffic congestion can be reduced.

Figure 19A:
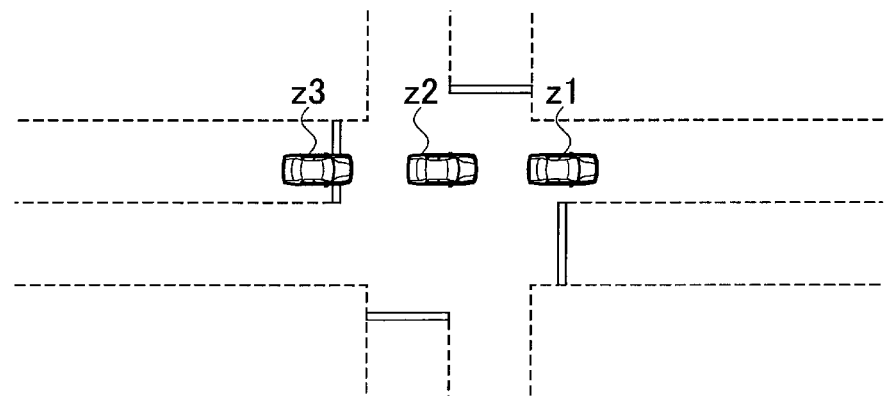
FIG. 19A is an explanatory view illustrating a travel state in which the host vehicle passes an intersection without employing the automatic driving characteristics.
Figure 19B:
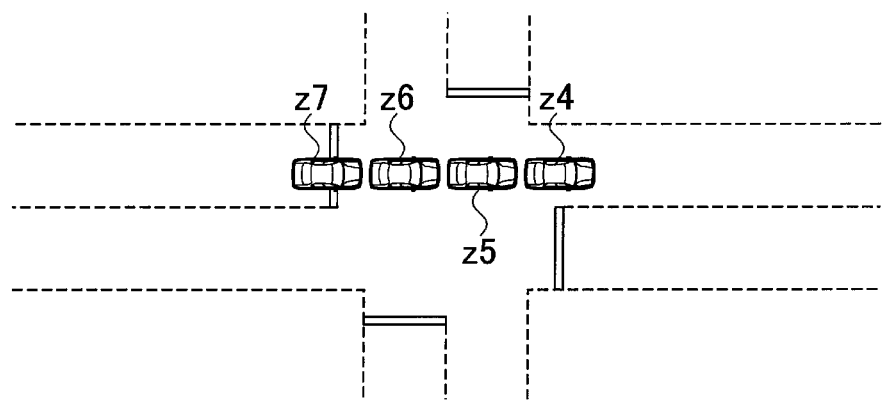
FIG. 19B is an explanatory view illustrating a travel state in which the host vehicle passes an intersection while employing the automatic driving characteristics.

FIGS. 19A and 19B are explanatory views illustrating an example of determining the automatic driving characteristics when the host vehicle starts at the intersection. This is assumed to be the case where the host vehicle stops at the intersection due to a traffic signal being red and then starts when the traffic signal turns green. The automatic driving characteristic setting unit 8 obtains the type of the travel state (in this case, intersection passing), the positional relationship between the preceding vehicle and the host vehicle, and the information on the traffic signal as input parameters.

Matching the acceleration and the start timing with those of the preceding vehicle at the start within a range in which the host vehicle does not collide with the preceding vehicle can increase the number of vehicles passing the intersection while the traffic signal is green. Specifically, when the start is not controlled, as illustrated in FIG. 19A, intervals between the vehicles are large and the number of vehicles passing the intersection is small. Specifically, three vehicles z1, z2, z3 passes the intersection. Meanwhile, when the start is controlled by setting the automatic driving characteristics, as illustrated in FIG. 19B, the number of vehicles passing the intersection is four which are vehicles z4, z5, z6, z7 and the vehicles passing the intersection can be increased.

Figure 20A:
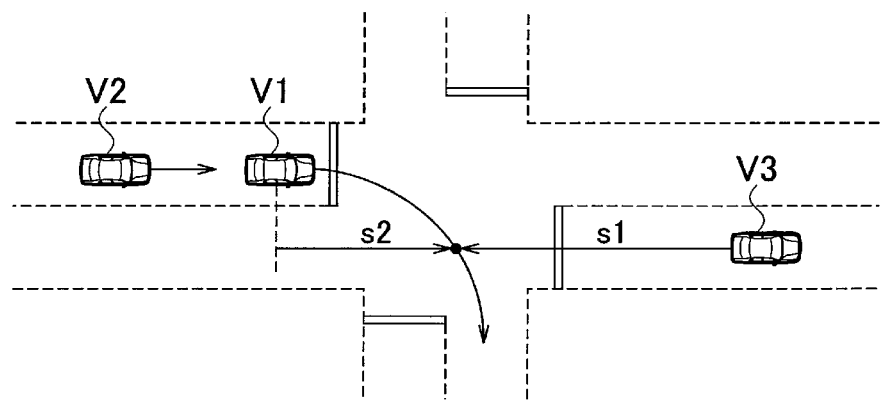
FIG. 20A is an explanatory view illustrating a travel state in which the host vehicle temporarily stops at an intersection and then turns right.
Figure 20B:
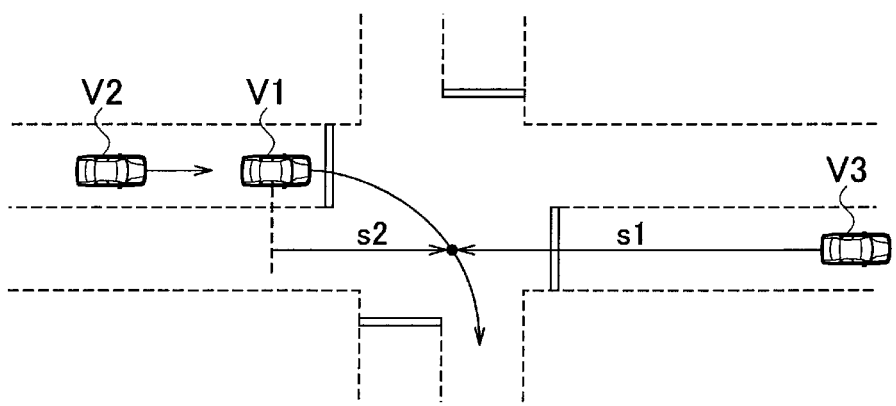
FIG. 20B is an explanatory view illustrating a travel state in which the host vehicle turns right without stopping at an intersection.
Figure 21:
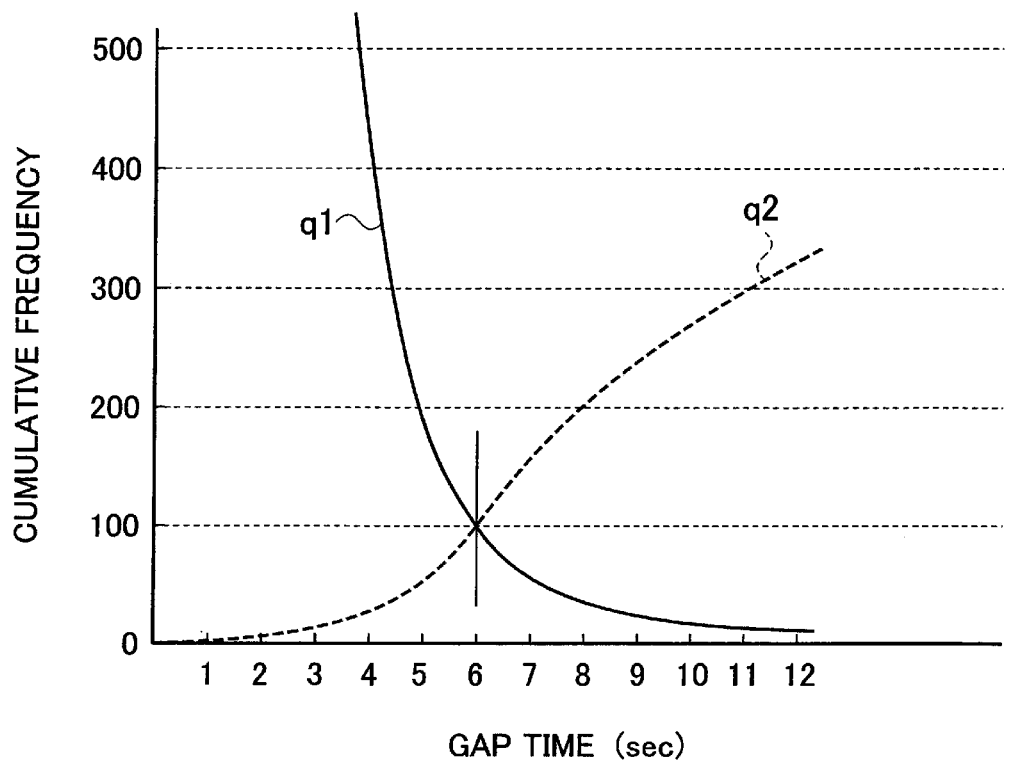
FIG. 21 is a graph illustrating frequencies in the case where the vehicle turns right without stopping at an intersection and in the case where the vehicle temporarily stops and then turns right.

FIGS. 20A, 20B, and 21 are explanatory views illustrating an example in which, when the host vehicle V1 is to turn right at an intersection, the automatic driving characteristic setting unit 8 determines whether to cause the host vehicle V1 to temporarily stop or cause it to turn right without stopping. As illustrated in FIGS. 20A and 20B, the time required for an oncoming vehicle V3 to reach the intersection is referred to as reaching time s1 and the time required for the host vehicle to reach the intersection is referred to as reaching time s2. The automatic driving characteristic setting unit 8 calculates the difference between the reaching time s1 and the reaching time s2 (s1-s2; this is referred to as gap time Δs) and, when the gap time Δs is longer than a preset threshold time (for example, six seconds), the host vehicle V1 turns right at the intersection without stopping. Meanwhile, when the gap time Δs is the threshold time or less, the host vehicle V1 temporarily stops at the intersection.

Specifically, as illustrated in FIG. 20A, when the host vehicle V1 is approaching the intersection and the oncoming vehicle V3 is traveling at a position close to the intersection (when the reaching time s1 is short), the host vehicle V1 temporarily stops and turns right after the oncoming vehicle V3 passes the intersection. In this case, a following vehicle V2 temporarily stops at the intersection and then restarts to go straight.

Meanwhile, as illustrated in FIG. 20B, when the host vehicle V1 is approaching the intersection and the oncoming vehicle V3 is traveling at a position relatively far away from the intersection (when the reaching time s1 is long), the host vehicle V1 turns right at the intersection without stopping. In this case, the following vehicle V2 can go straight without stopping at the intersection.

Setting the gap time Δs as described above enables appropriate determination of right turn. Accordingly, traffic congestion at an intersection can be reduced.

FIG. 21 is a graph illustrating a cumulative frequency of each gap time Δs in the case where the host vehicle temporarily stops in right turn and that in the case where the host vehicle turns right without stopping. The curve q1 illustrates a relationship between the gap time Δs and the frequency of the case where the vehicle stops at an intersection and the shorter the gap time Δs is, the greater the number of vehicles to stop is. The curve q2 illustrates a relationship between the gap time Δs and the frequency of the case where the vehicle turns right without stopping at an intersection and the longer the gap time Δs is, the greater the number of vehicles turning right without stopping at an intersection is.

In the embodiment, an intersection between the curves q1 and q2 are set as the aforementioned threshold time. In the case of FIG. 21, the threshold time is six seconds. Specifically, when the gap time Δs is longer than six seconds, the host vehicle V1 is controlled to turn right at an intersection without stopping and, when the gap time Δs is six seconds or less, the host vehicle V1 is controlled to stop at an intersection. This enables smooth right turn at an intersection and can reduce traffic congestion at an intersection.

[Description of Driving Characteristic Switching Unit 11]

Next, the driving characteristic switching unit 11 illustrated in FIG. 1 is described. The driving characteristic switching unit 11 includes the interest level determination unit 12 and a driving characteristic setting unit 13.

The interest level determination unit 12 determines the occupant's level of interest in the travel state based on the "surrounding gazing parameter" and the "blinking parameters" outputted by the aforementioned eyeball state detection unit 2. Specifically, when the surrounding gazing level F1 described in the aforementioned formula (1) is higher than a preset first threshold F1$th$, the interest level determination unit 12 determines that the level of interest in the travel state is higher than the reference value. Moreover, when the opening-closing behavior characteristic amount PE described in the aforementioned formula (2) is lower than a preset second threshold PEth, when the eye opening degree X2 in the eye open state is higher than a preset third threshold X2$th$, or when the eye closing speed X1 is higher than a preset fourth threshold X1$th$, the interest level determination unit 12 determines that the level of interest in the travel state is higher than the reference value.

Moreover, the interest level determination unit 12 determines the occupant's level of interest in the travel state depending on the operation states of the relevant switches and the irrelevant switches outputted by the switch operation detection unit 3. Specifically, when the operation frequency of the relevant switches is higher than a preset fifth threshold, the interest level determination unit 12 determines that the level of interest in the travel state is higher than the reference value. Moreover, when the operation frequency of the irrelevant switches is higher than a preset sixth threshold, the interest level determination unit 12 determines that the level of interest in the travel state is lower than the reference value.

Furthermore, as described above, when the interest level determination unit 12 estimates the consciousness amount of the driver analyzed in the conversation determination unit 16 and the consciousness amount is higher than a preset seventh threshold, the interest level determination unit 12 determines that the level of interest in the travel state is higher than the reference value.

The driving characteristic setting unit 13 determines control contents of the automatic driving control based on the level of interest determined by the interest level determination unit 12. Specifically, when the occupant's level of interest in the travel state is higher than the reference value, the automatic driving is performed to match the driving characteristics of the occupant. For example, the driving characteristic setting unit 13 controls the vehicle speed and the inter-vehicle distance such that they match the characteristics of the occupant. Specifically, when the driver's level of interest in current driving is higher than the reference value, driving with the driving characteristics preferred by the driver (occupant) is performed as much as possible. This can suppress feeling of strangeness given to the driver. The driving characteristic setting unit 13 thus extracts the driving characteristic data in the manual driving of the driver from the manual driving characteristic database 5 and the automatic driving is performed to match the driving characteristics of the driver.

Figure 22:
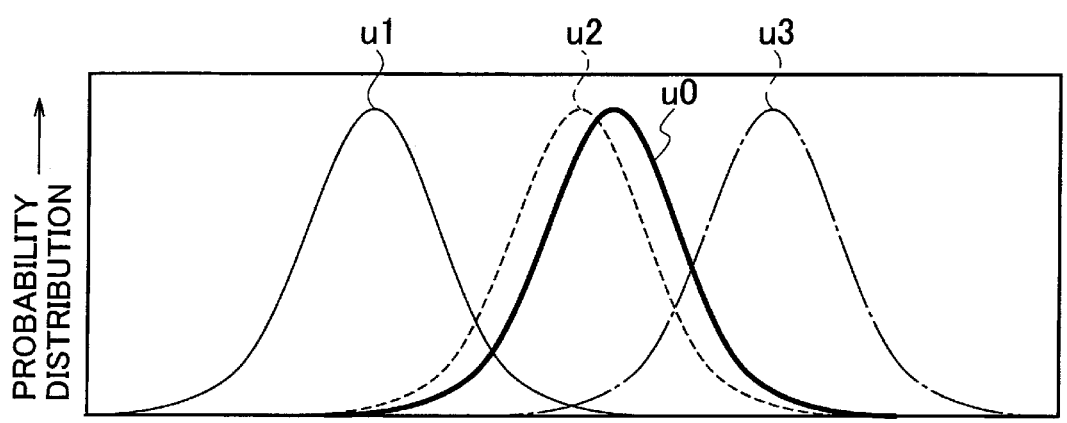
FIG. 22 is an explanatory view illustrating a probability distribution of the manual driving characteristics.

For example, as illustrated in FIG. 22, three manual driving characteristics u1, u2, u3 are stored in the manual driving characteristic database 5. Then, the driving characteristic setting unit 13 obtains the current driving characteristic u0 in the automatic driving of the host vehicle. Specifically, the driving characteristic setting unit 13 obtains the type of travel state, the positional relationships with the other vehicles in front of and behind the host vehicle, the road information (speed limit), and the current travel information of the vehicle (for example, traveling speed) as input parameters. Then, the driving characteristic setting unit 13 calculates meaningful parameters by using the algorithm of machine learning and obtains the current driving characteristic.

In the example illustrated in FIG. 22, the driving characteristic setting unit 13 selects the manual driving characteristic u2 closest to the current driving characteristic u0 of the host vehicle, from the manual driving characteristics u1 to u3. Then, when the interest level determination unit 12 determines that the level of interest in the driving is higher than the reference value, the driving characteristic setting unit 13 selects the manual driving characteristics u2 and outputs control instructions.

Meanwhile, when the occupant's level of interest in the current driving is low, the automatic driving matching the surrounding state is performed. Specifically, when the level of interest in the travel state is low, it is preferable to perform automatic driving with driving characteristics matching the travel state of the surroundings as much as possible. Performing the automatic driving with driving characteristics matching the travel state of the surroundings can suppress interference with travel of the other vehicles in the surroundings and reduce feeling of strangeness given to occupants of the other vehicles. Moreover, since a flow of traffic can be adjusted, traffic congestion can be reduced. Accordingly, the driving characteristic setting unit 13 selects the driving characteristics determined by the automatic driving characteristic setting unit 8, specifically the aforementioned control illustrated in FIGS. 17 to 21 and outputs the control instructions.

[Description of Processing Operation]

Figure 23:
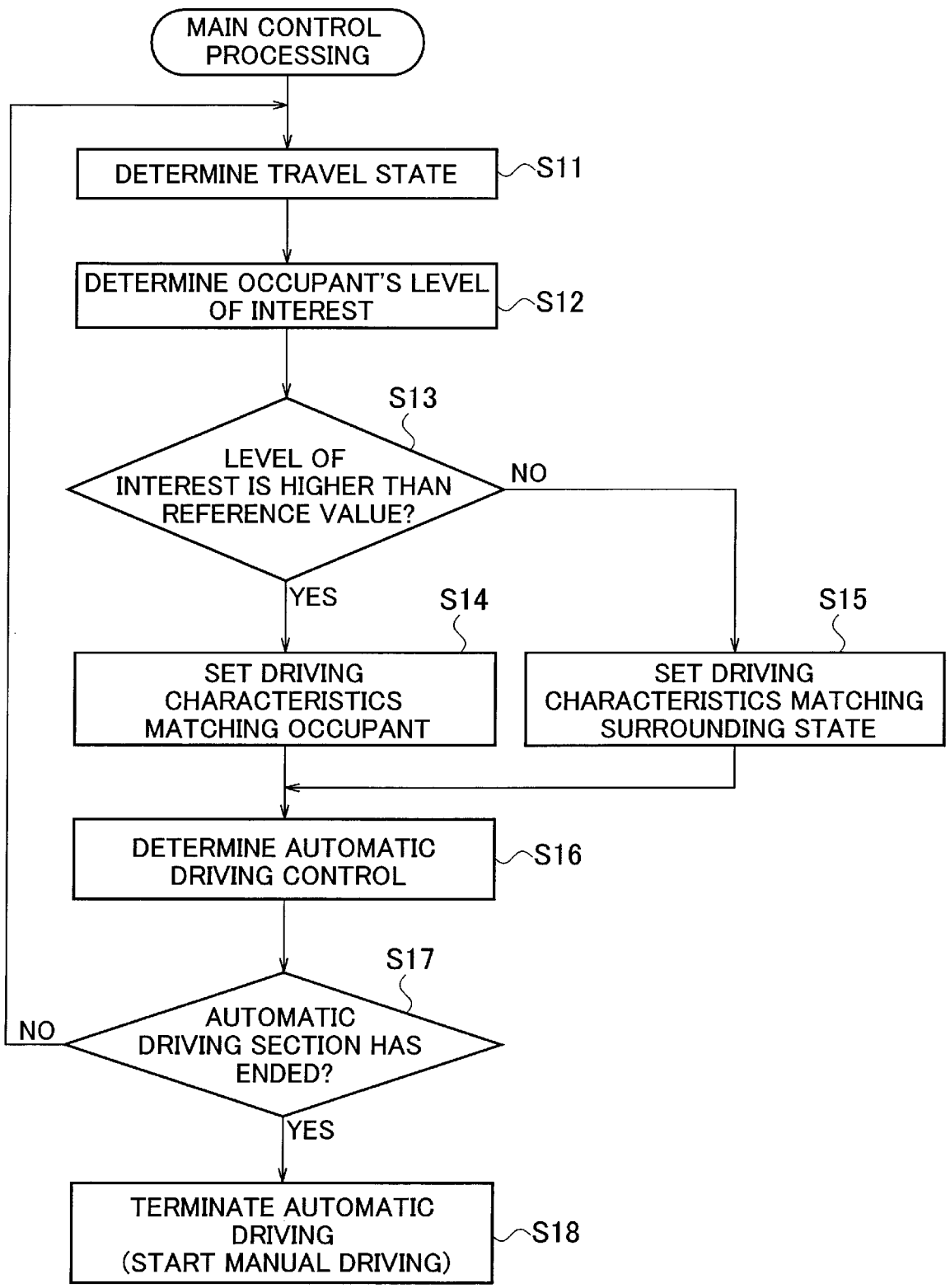
FIG. 23 is a flowchart illustrating processing steps of the control device of the automatic driving vehicle according the embodiment of the present invention.
Figure 24:
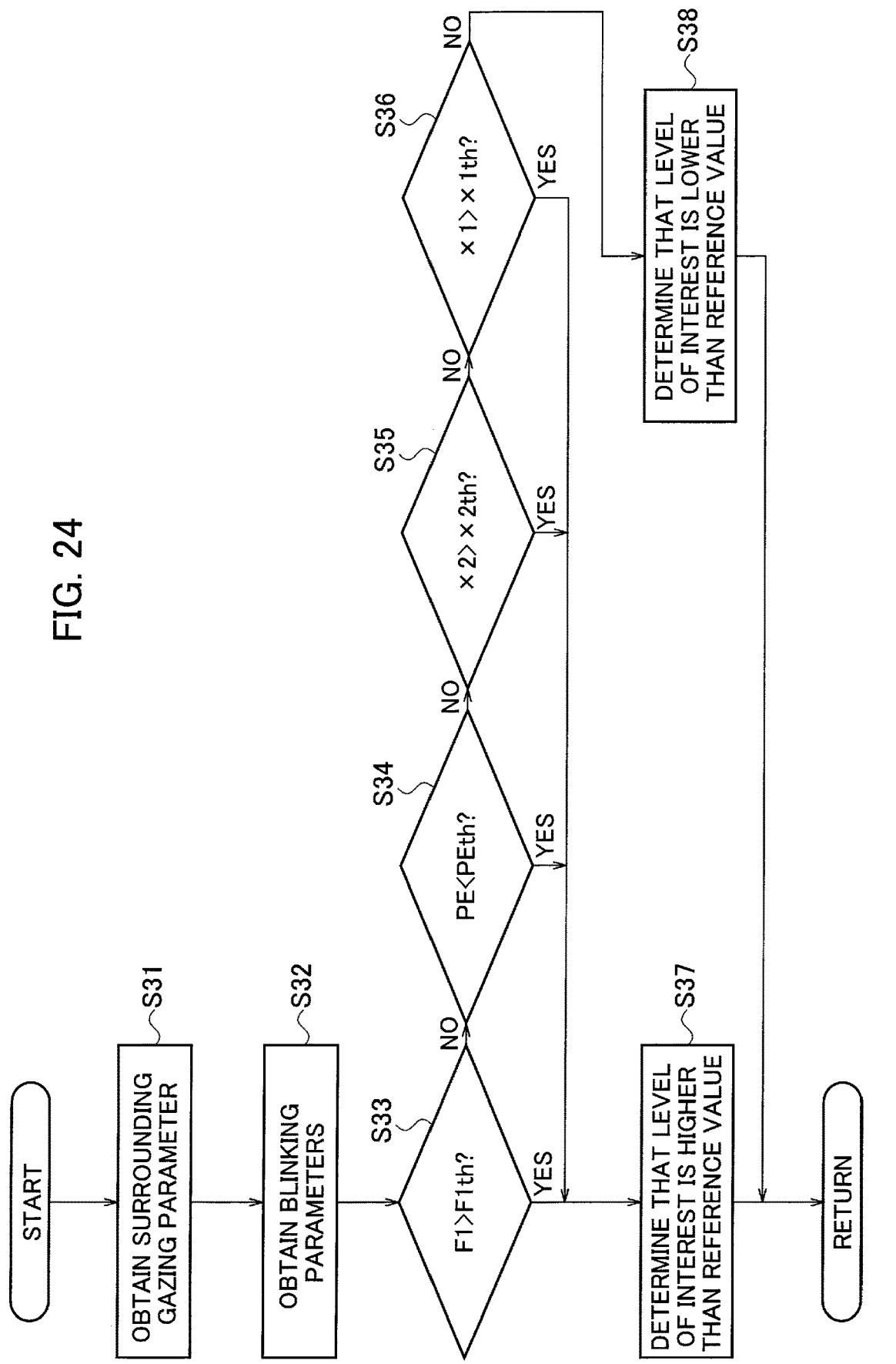
FIG. 24 is a flowchart illustrating processing of determining whether the level of interest is higher than a reference value based on the movement of the eyeballs.
Figure 25:
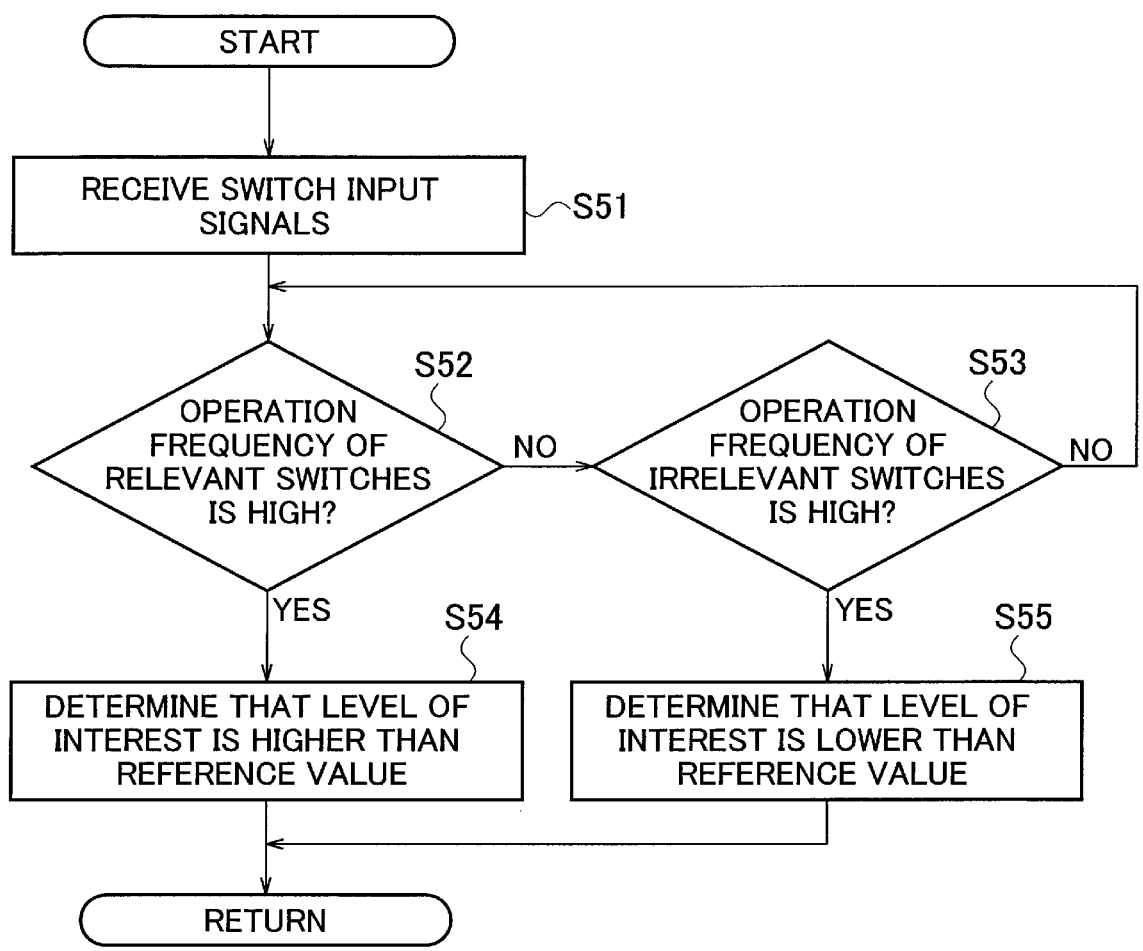
FIG. 25 is a flowchart illustrating processing of determining whether the level of interest is higher than the reference value based on the frequency of switch operations by the occupant.

Next, processing steps of the control device in the automatic driving vehicle according to the embodiment are described with reference to the flowcharts illustrated in FIGS. 23, 24, and 25. FIG. 23 depicts all processing steps and FIGS. 24 and 25 depict detailed processing of S13 in FIG. 23.

The processing illustrated in FIG. 23 is performed by the driving characteristic setting unit 13 illustrated in FIG. 1. First, in step S11 of FIG. 23, the driving characteristic setting unit 13 determines the travel state of the host vehicle. In this processing, the driving characteristic setting unit 13 uses the vehicle speed data, the acceleration data, the steering angle data, and the like detected in the host vehicle state detection unit 6 as illustrated in FIG. 10. Alternatively, the driving characteristic setting unit 13 can determine the current travel state based on information on the vehicle speed, the acceleration, and the steering angle obtained from a CAN (Controller Area Network) and information from sensors such as radar and a camera.

In step S12, the interest level determination unit 12 determines the occupant's level of interest in the travel state. As described above, the determination of the level of interest is performed based on the movement of the eyeball of the occupant, the frequency of switch operations, the contents of conversation, and the like. Furthermore, in step S13, whether the level of interest is higher than the reference value is determined.

Processing steps of determining the level of interest are described in detail below with reference to FIGS. 24 and 25. This processing is performed by the interest level determination unit 12 illustrated in FIG. 1.

FIG. 24 is a flowchart illustrating processing of determining the level of interest based on the eyeball information. First, in step S31, the interest level determination unit 12 obtains the "surrounding gazing parameter" from the eyeball state detection unit 2 and, in step S32, obtains the "blinking parameters."

In step S33, the interest level determination unit 12 determines whether the surrounding gazing level F1 is higher than the first threshold F$1th$ based on the surrounding gazing parameter.

When determining that the surrounding gazing level F1 is higher than the first threshold F$1th$ (YES in step S33), in step S37, the interest level determination unit 12 determines that the occupant's level of interest in the travel state is higher than the reference value.

Meanwhile, when determining that the surrounding gazing level F1 is lower than the first threshold F$1th$ (NO in step S33), in step S34, the interest level determination unit 12 determines whether the opening-closing behavior characteristic amount PE is lower than the second threshold PEth.

When the opening-closing behavior characteristic amount PE is lower than the second threshold PEth (YES in step S34), the interest level determination unit 12 performs the processing of step S37. Meanwhile, when the opening-closing behavior characteristic amount PE is higher than the second threshold PEth (NO in step S34), in step S35, the interest level determination unit 12 determines whether the eye opening degree in the eye open state is high based on the blinking information of the occupant. In this processing, the interest level determination unit 12 determines whether the eye opening degree X2 in the eye open state is higher than the third threshold X$2th$.

When the eye opening degree X2 in the eye open state is higher than the third threshold X$2th$ (YES in step S35), the interest level determination unit 12 performs the processing of step S37. When the eye opening degree X2 in the eye open state is lower than the third threshold X$2th$ (NO in step S35), in step S36, the interest level determination unit 12 determines whether the eye closing speed X1 is higher than the fourth threshold X$1th$ based on the blinking parameters.

When determining that the eye closing speed X1 is higher than the fourth threshold X$1th$ (YES in step S36), in step S37, the interest level determination unit 12 determines that the level of interest is higher than the reference value. Meanwhile, when determining that the eye closing speed X1 is lower than the fourth threshold X$1th$ (NO in step S36), in step S38, the interest level determination unit 12 determines that the level of interest is lower than the reference value. Then, the processing of step S13 in FIG. 23 is performed based on the determination result of step S37 or S38.

Next, description is given of processing of determining the level of interest depending on the frequency of switch operations with reference to the flowchart illustrated in FIG. 25. This processing is performed by the interest level determination unit 12.

First, in step S51, the interest level determination unit 12 obtains information on the frequency of various switch operations outputted by the switch operation detection unit 3.

In step S52, the interest level determination unit 12 determines whether the operation frequency of the relevant switches is high. As described above, the relevant switches include, for example, the speed setting switch, the inter-vehicle distance setting switch, the lane changing switch, and the like.

When the operation frequency of the relevant switches is higher than the preset fifth threshold (YES in step S52), in step S54, the interest level determination unit 12 determines that the occupant's level of interest in the travel state is higher than the reference value.

Meanwhile, when the operation frequency of the relevant switches is lower than the fifth threshold (NO in step S52), in step S53, the interest level determination unit 12 determines whether the operation frequency of the irrelevant switches is higher than the sixth threshold. As described above, the irrelevant switches include, for example, the window opening-closing switch, the audio operation switch, the navigation operation switch, the seat position adjustment switch, and the like.

When the operation frequency of the irrelevant switches is higher than the sixth threshold (YES in step S53), in step S55, the interest level determination unit 12 determines that the occupant's level of interest in the travel state is lower than the reference value.

Moreover, when the operation frequency of the irrelevant switches is lower than the sixth threshold (NO in step S53), the case where the frequency of switch operations is low or no operations are performed is conceivable. Accordingly, the determination is suspended and the processing returns to step S52.

The processing depicted in step S13 of FIG. 23 is thus performed, that is whether the occupant's level of interest in the travel state is higher than the reference value is determined. Note that it is possible determine the state of the conversation of the occupant and obtain the level of interest in the driving based on the state of the conversation as described above.

When determining that the level of interest is higher than the reference value in step S13 of FIG. 23 (YES in step S13), in step S14, the driving characteristic setting unit 13 sets the driving characteristics (vehicle speed, inter-vehicle distance, and the like) matching the manual driving characteristics of the occupant.

Examples of the cases where the occupant's level of interest in the travel state is high include the case where the host vehicle is not following the flow of the other vehicles in the surroundings, the case where the occupant cannot adapt to the road condition, the case where targets which require attention such as trucks, luxury vehicles, obstacles, road structures, and the like are approaching, and the like. In such travel states, the driving characteristic setting unit 13 sets travel characteristics such as the vehicle speed, the inter-vehicle distance (front, rear, left, right), the lane changing, and the like to the driving characteristics matching the occupant's preference. Automatic driving in which the feeling of strangeness given to the occupant is reduced can be thereby achieved.

Meanwhile, when the level of interest is determined to be lower than the reference value (NO in step S13), in step S15, the driving characteristic setting unit 13 sets the vehicle speed and the inter-vehicle distance matching the surrounding state.

In step S16, the driving characteristic setting unit 13 determines the driving characteristics set in the processing of step S14 or the driving characteristics set in the processing of step S15 as the driving characteristics in the automatic driving.

In step S17, the driving characteristic setting unit 13 determines whether an automatic driving section has ended. When the automatic driving section has not ended, the processing returns to step S11. When the automatic driving section has ended, the automatic driving is terminated and is switched to the manual driving.

As described above, in the control method of the automatic driving vehicle according to the embodiment, the occupant's level of interest is detected and the host vehicle is controlled based on the driving characteristics depending on the level of interest. Accordingly, it is possible to recognize the intention of the occupant and reflect the intention of the occupant in the travel characteristics of the vehicle. Hence, automatic driving travel appropriately reflecting the intention of the occupant can be achieved.

Moreover, when the occupant's level of interest in the vehicle travel is lower than the reference value, the automatic driving control is performed with the driving characteristics matching the surrounding state being set. Accordingly, the traveling speed and the inter-vehicle distance are controlled to match the surrounding vehicles and occurrence of traffic congestion can be reduced without disturbing the flow of traffic.

Furthermore, when the occupant's level of interest in the vehicle travel is higher than the reference value, the driving characteristics based on the driving characteristics in the manual driving by the occupant are set. Accordingly, automatic driving with no feeling of strangeness for the occupant can be achieved.

Moreover, in the embodiment, the occupant's level of interest in the vehicle travel is detected based on the movement of eyeball detected by the eyeball state detection unit 2. Specifically, when the surrounding gazing level F1 is higher than the first threshold F1$th$, the level of interest is determined to be higher than the reference value. Accordingly, the level of interest can be determined with high accuracy.

Furthermore, when the proportion of the eye closed time to the blinking interval (opening-closing behavior characteristic amount PE) is lower than the second threshold PEth, the level of interest is determined to be higher than the reference value. Accordingly, the level of interest can be determined with high accuracy.

Moreover, when the eye opening degree X2 in the eye open state is higher than the third threshold X2$th$, the level of interest is determined to be higher than the reference value. Accordingly, the level of interest can be determined with high accuracy.

Furthermore, when the eye closing speed X1 is higher than the fourth threshold X1$th$, the level of interest is determined to be higher than the reference value. Accordingly, the level of interest can be determined with high accuracy.

Moreover, when the operation frequency of the relevant switches is higher than the fifth threshold, the level of interest is determined to be higher than the reference value. Accordingly, the level of interest can be determined in simple processing.

Furthermore, when the operation frequency of the irrelevant switches is higher than the sixth threshold, the level of interest is determined to be lower than the reference value. Accordingly, the level of interest can be determined in simple processing.

Moreover, the level of interest is determined based on the conversation of the occupant. In detail, the consciousness amount of the occupant analyzed by the conversation determination unit 16 is estimated and, when the consciousness amount is great, the level of interest is determined to be higher than the reference value. Accordingly, the level of interest can be determined with high accuracy based on the contents of the conversation of the occupant.

Furthermore, using the level of interest of the driver who is the occupant of the vehicle enables automatic driving control further matching the occupant's preference.

Although the case where the level of interest is determined based on the movement of the eyeballs as in FIG. 24 and the case where the level of interest is determined based on the switch operations as in FIG. 25 are described in the aforementioned flowcharts, the level of interest may be determined by using both methods.

For example, the determination may be performed as follows: the level of interest is determined based on the movement of the eyeball; then only when the level of interest is determined to be lower than the reference value, the level of interest is determined based on the switch operations; and then only when the level of interest is determined to be lower than the reference value, the level of interest is determined based on the contents of the conversation.

Moreover, the processing of step S13 can be performed such that the consciousness amount of the occupant analyzed by the conversation determination unit 16 is estimated and, when the consciousness amount is great, the level of interest is determined to be high as described above.

Furthermore, although the aforementioned embodiment is described with the driver given as an example of the occupant, the occupant of the present invention is not limited to the driver and the automatic driving control can be performed by using driving characteristics of occupants other than the driver.

Description of Modified Example 1

Next, a modified example of the aforementioned embodiment is described. In the aforementioned embodiment, when the occupant's level of interest in the travel state is determined to be higher than the reference value, the automatic driving is performed by extracting the driving characteristics matching the occupant's preference from the driving characteristics stored in the manual driving characteristic database 5.

Meanwhile, in the modified example, when the occupant of the host vehicle is gazing at another vehicle as a target, the level of interest in the other vehicle is determined to be higher than the reference value. Then, the driving characteristics of the other vehicle are extracted and the host vehicle is controlled by using the extracted driving characteristics. In other words, when the occupant's level of interest is higher than the reference value, the driving characteristics of a target in which the occupant is interested are detected and the automatic driving vehicle is controlled based on the driving characteristics of the target.

Specifically, the other vehicle at which the occupant is gazing is specified based on the surrounding gazing parameter detected by the eyeball state detection unit 2 illustrated in FIG. 1 and then the driving characteristics such as the traveling speed of the other vehicle and the inter-vehicle distance between the other vehicle and the preceding vehicle are detected. Then, the host vehicle is controlled to match the driving characteristics of the other vehicle. As a result, when there is another vehicle considered as a model by the occupant and the occupant is gazing at the other vehicle, the host vehicle is controlled to match the driving characteristics of the other vehicle. Accordingly, the host vehicle can be controlled with the driving characteristics matching the driver's preference being set. Note that the target at which the occupant is gazing is not limited to another car and only needs to be a moving object such as a motorcycle, a bicycle, and a pedestrian and the host vehicle may be controlled depending on the movement characteristics of the moving object as described above.

Description of Modified Example 2

Next, Modified Example 2 of the embodiment is described. In Modified Example 2, when the occupant of the host vehicle is gazing at a stationary object in the surroundings of the host vehicle as a target, the level of interest is determined depending on the characteristics of the stationary object and the host vehicle is controlled depending on the level of interest. For example, when the occupant is gazing at a road sign as the aforementioned stationary object, the level of interest is determined to be high. Meanwhile, when the occupant is gazing at a landscape such as a mountain or the sky as the aforementioned stationary object, the level of interest is determined to be low. As a method of detecting a stationary object outside the vehicle at which the occupant is gazing, the line of sight, the stationary object in the extending direction of the line of sight, and the characteristics of this stationary object may be determined by using signs and geographic data. Moreover, the stationary object and the characteristics thereof may be determined by performing sensing in the direction in which the line of sight extends.

Moreover, although the automatic driving is performed based on the driving characteristics in the manual driving when the level of interest is higher than the reference value in the embodiment, it is possible to measure the level of interest while the automatic driving is performed based on the driving characteristics in the manual driving and adjust the driving characteristics of the automatic driving. For example, when the level of interest is higher than the reference value, the driving characteristics may be set between the driving characteristics in the manual driving and the driving characteristics depending on the surrounding state such that the higher the level of interest is, the closer the set driving characteristics are to the driving characteristics in the manual driving. For example, the level of interest higher than the reference value may be set such that the more intense the movement of the line of sight of the occupant is, the higher the level of interest is set among the levels of interest higher than the reference value. The same applies to the case where the level of interest is lower than the reference value. When the level of interest is lower than the reference value, the driving characteristics may be set between the driving characteristics in the manual driving and the driving characteristics depending on the surrounding state such that the lower the level of interest is, the closer the set driving characteristics are to the driving characteristics depending on the surrounding state.

Although the control method of the automatic driving vehicle in the present invention is described above based on the illustrated embodiment, the present invention is not limited to this. The configuration of each part can be replaced by any configuration having a similar function.

REFERENCE SIGNS LIST 1 interest level detection unit
2 eyeball state detection unit
3 switch operation detection unit
4 individual-matched driving characteristic determination unit
5 manual driving characteristic database
6 host vehicle state detection unit 7 manual driving characteristic learning unit
8 automatic driving characteristic setting unit
9 surrounding state detection unit
11 driving characteristic switching unit
12 interest level determination unit
13 driving characteristic setting unit
14 travel state detection unit
16 conversation determination unit
17 outside camera
18 eyeball
19 pupil
20 infrared camera
21 infrared light
22 image processing unit
23 light-camera controller
25 lens
26 visible light blocking filter
28 infrared image sensor
29 digital filter
30 image processing GPU
31 parameter extraction unit
32 vehicle speed sensor
33 acceleration sensor
34 steering angle sensor
35 inter-vehicle space detection unit
36 non-vehicle object detection unit
37 surrounding vehicle type detection unit
38 lane detection unit
39 road type detection unit
40 traffic information detection unit
42 microphone
43 speaker
44 information presenting unit
45 analyzer

The invention claimed is:

1. An automatic driving vehicle control method of controlling an automatic driving vehicle, the method comprising:
    detecting a level of interest of an occupant in a travel state of the automatic driving vehicle based on a line of sight of the occupant viewing another vehicle in surroundings of the automatic driving vehicle, wherein the occupant is determined to be viewing the other vehicle when a position where the other vehicle is present in an outside image matches the line of sight of the occupant for at least a threshold time; and
    when the level of interest is higher than a predetermined reference value, adjusting driving characteristics in automatic driving depending on the level of interest between driving characteristics in manual driving and driving characteristics depending on a surrounding state of the automatic driving vehicle.

2. An automatic driving vehicle control method of controlling an automatic driving vehicle, comprising:
    detecting a level of interest of an occupant in a travel state of the automatic driving vehicle based on a line of sight of the occupant viewing another vehicle in surroundings of the automatic driving vehicle, wherein the occupant is determined to be viewing the other vehicle when a position where the other vehicle is present in an outside image matches the line of sight of the occupant for at least a threshold time;
    when the level of interest is higher than a predetermined reference value, detecting driving characteristics of the other vehicle in which the occupant is interested, and adjusting driving characteristics in automatic driving based on the detected driving characteristics of the other vehicle; and
    when the level of interest is less than or equal to the predetermined reference value, adjusting the driving characteristics in the automatic driving based on driving characteristics depending on a surrounding state of the automatic driving vehicle.

3. An automatic driving vehicle control method of controlling an automatic driving vehicle, comprising:
    determining whether an occupant of the automatic driving vehicle is gazing at a stationary object in surroundings of the automatic driving vehicle, wherein the occupant is determined to be gazing at the stationary object when a position where the stationary object is present in an outside image matches a line of sight of the occupant for at least a threshold time;
    when the occupant is gazing at the stationary object, determining a level of interest of the occupant in a travel state of the automatic driving vehicle based on characteristics of the stationary object, wherein the characteristics of the stationary object are determined based on geographic data or by sensing; and
    adjusting driving characteristics in automatic driving based on the level of interest between driving characteristics in manual driving and driving characteristics depending on a surrounding state of the automatic driving vehicle.

4. An automatic driving vehicle control method in an automatic driving vehicle control device configured to control an automatic driving vehicle, the method comprising:
    detecting a level of interest of an occupant in a travel state of the automatic driving vehicle;
    controlling the automatic driving vehicle based on driving characteristics depending on the level of interest; and
    when the level of interest is lower than a preset reference value, setting gap time which is a difference between time an oncoming vehicle takes to reach an intersection and time the automatic driving vehicle takes to cut across in front of the oncoming vehicle at the intersection and which is used to determine whether the automatic driving vehicle is to be stopped at the intersection.

5. The automatic driving vehicle control method according to claim 1, further comprising:
    detecting traffic information relating to travel of the automatic driving vehicle; and
    adjusting the driving characteristics based on the traffic information.

6. The automatic driving vehicle control method according to claim 1, further comprising:
    detecting movement of an eyeball of the occupant; and
    when a surrounding gazing level is higher than a first threshold, determining that the level of interest is higher than the reference value and controlling the automatic driving vehicle based on driving characteristics in manual driving.

7. The automatic driving vehicle control method according to claim 1, further comprising:
    detecting movement of an eyeball of the occupant; and
    when a proportion of eye closed time to a blinking interval is smaller than a second threshold, determining that the level of interest is higher than the reference value and controlling the automatic driving vehicle based on driving characteristics in manual driving.

8. The automatic driving vehicle control method according to claim 1, further comprising:

detecting movement of an eyeball of the occupant; and
when an eye opening degree in an eye open state is higher than a third threshold, determining that the level of interest is higher than the reference value and controlling the automatic driving vehicle based on driving characteristics in manual driving.

9. The automatic driving vehicle control method according to claim 1, further comprising:
detecting movement of an eyeball of the occupant; and
when eye closing speed is higher than a fourth threshold, determining that the level of interest is higher than the reference value and controlling the automatic driving vehicle based on driving characteristics in manual driving.

10. The automatic driving vehicle control method according to claim 1, further comprising:
detecting a switch operation by the occupant; and
when an operation frequency of a switch relevant to travel of the automatic driving vehicle is higher than a fifth threshold, determining that the level of interest is higher than the reference value and controlling the automatic driving vehicle based on driving characteristics in manual driving.

11. The automatic driving vehicle control method according to claim 1, further comprising:
detecting a switch operation by the occupant; and
when an operation frequency of a switch irrelevant to travel of the automatic driving vehicle is higher than a sixth threshold, determining that the level of interest is lower than the reference value and controlling the automatic driving vehicle based on driving characteristics depending on a surrounding state.

12. The automatic driving vehicle control method according to claim 5, further comprising:
detecting conversation of the occupant; and
determining whether the level of interest is higher than the reference value based on contents of the conversation.

13. The automatic driving vehicle control method according to claim 1, wherein the occupant is a driver.

14. An automatic driving vehicle control device configured to control an automatic driving vehicle, the automatic driving vehicle control device comprising a controller configured to:
detect a level of interest of an occupant in a travel state of the automatic driving vehicle based on a line of sight of the occupant viewing another vehicle in surroundings of the automatic driving vehicle, wherein the occupant is determined to be viewing the other vehicle when a position where the other vehicle is present in an outside image matches the line of sight of the occupant for at least a threshold time; and
when the level of interest is higher than a predetermined reference value, adjust driving characteristics in automatic driving depending on the level of interest between driving characteristics in manual driving and driving characteristics depending on a surrounding state of the automatic driving vehicle.

\* \* \* \* \*